US012662560B2

(12) United States Patent
Kim et al.

(10) Patent No.: US 12,662,560 B2
(45) Date of Patent: Jun. 23, 2026

(54) POLYETHYLENE COMPOSITION AND METHOD FOR PREPARING THE SAME

(71) Applicant: LG Chem, Ltd., Seoul (KR)

(72) Inventors: Dodam Kim, Daejeon (KR); Manseong Jeon, Daejeon (KR); Yi Young Choi, Daejeon (KR); Min Jeong Lee, Daejeon (KR); Eunyeong Jin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 968 days.

(21) Appl. No.: 17/776,852

(22) PCT Filed: Sep. 29, 2021

(86) PCT No.: PCT/KR2021/013291
§ 371 (c)(1),
(2) Date: May 13, 2022

(87) PCT Pub. No.: WO2022/071735
PCT Pub. Date: Apr. 7, 2022

(65) Prior Publication Data

US 2022/0403070 A1 Dec. 22, 2022

(30) Foreign Application Priority Data

Sep. 29, 2020 (KR) ........................ 10-2020-0127476
Sep. 28, 2021 (KR) ........................ 10-2021-0127982

(51) Int. Cl.
*C08F 110/02* (2006.01)

(52) U.S. Cl.
CPC .................................. *C08F 110/02* (2013.01)

(58) Field of Classification Search
None
See application file for complete search history.

(56) References Cited

U.S. PATENT DOCUMENTS

| | | | |
|---|---|---|---|
| 5,914,289 | A | 6/1999 | Razavi |
| 6,846,863 | B2 | 1/2005 | Plume et al. |
| 2013/0137828 | A1 | 5/2013 | Michie, Jr. et al. |
| 2015/0266985 | A1 | 9/2015 | Uhm et al. |
| 2016/0304644 | A1 | 10/2016 | Hlavinka et al. |
| 2017/0342176 | A1 | 11/2017 | Wang et al. |
| 2019/0062474 | A1 | 2/2019 | Kim et al. |
| 2020/0031717 | A1 | 1/2020 | Gong et al. |
| 2020/0115475 | A1 | 4/2020 | Im et al. |

(Continued)

FOREIGN PATENT DOCUMENTS

| | | | |
|---|---|---|---|
| EP | 3363820 | A1 | 8/2018 |
| EP | 3553122 | A1 | 10/2019 |

(Continued)

OTHER PUBLICATIONS

Search report from International Application No. PCT/KR2021/013291, mailed Jan. 14, 2022.

(Continued)

*Primary Examiner* — Catherine S Branch
(74) *Attorney, Agent, or Firm* — Lerner David LLP

(57) ABSTRACT

The present disclosure relates to a polyethylene composition capable of producing a molded product having excellent environmental stress crack resistance, and improving total volatile organic compound (TVOC) properties that can be generated by a low molecular weight polymer, and a method for preparing the same.

20 Claims, 1 Drawing Sheet

(56) References Cited

U.S. PATENT DOCUMENTS

| | | | |
|---|---|---|---|
| 2021/0032449 A1 | 2/2021 | Park et al. | |
| 2021/0230324 A1 | 7/2021 | Park et al. | |

FOREIGN PATENT DOCUMENTS

| | | | |
|---|---|---|---|
| EP | 3909988 | A1 | 11/2021 |
| JP | 2006206500 | A | 8/2006 |
| KR | 20040076965 | A | 9/2004 |
| KR | 101742446 | B1 | 6/2017 |
| KR | 20170073385 | A | 6/2017 |
| KR | 20180046291 | A | 5/2018 |
| KR | 20180067944 | A | 6/2018 |
| KR | 20180068715 | A | 6/2018 |
| KR | 20190073264 | A | 6/2019 |
| KR | 20190074963 | A | 6/2019 |
| KR | 20200026125 | A | 3/2020 |
| KR | 102116476 | B1 | 5/2020 |
| KR | 20200101873 | A | 8/2020 |
| RU | 2457224 | C2 | 7/2012 |
| WO | 2004076502 | A1 | 9/2004 |
| WO | 2014077617 | A1 | 5/2014 |
| WO | 2015034816 | A2 | 3/2015 |
| WO | 2017208106 | A1 | 12/2017 |
| WO | 2020171623 | A1 | 8/2020 |

OTHER PUBLICATIONS

Bourissou, Didier, et al., "The role of boron and phosphorous in Cp-based catalysts for olefin polymerization." C. R. Chimie vol. 9, Feb. 10, 2006, pp. 1120-1142.

Kohrt, Sonja, et al., "Borata-Alkene Derived Syntheses of (F5C6)2 B-Substituted Bis(indenyl) Group 4 Metal Complexes." Organometallics, Jul. 30, 2016, vol. 35, pp. 2689-2693.

Alexakis, A., et al., "Mild Protection and Deprotection of Alcohols as Ter-Butyl Ethers in the Field of Pherome Synthesis." Tetrahedrom Letters, vol. 29, No. 24, 1998, pp. 2951-2954.

Extended European Search Report including Written Opinion for Application No. 21876010.6 dated Dec. 12, 2022, pp. 1-11.

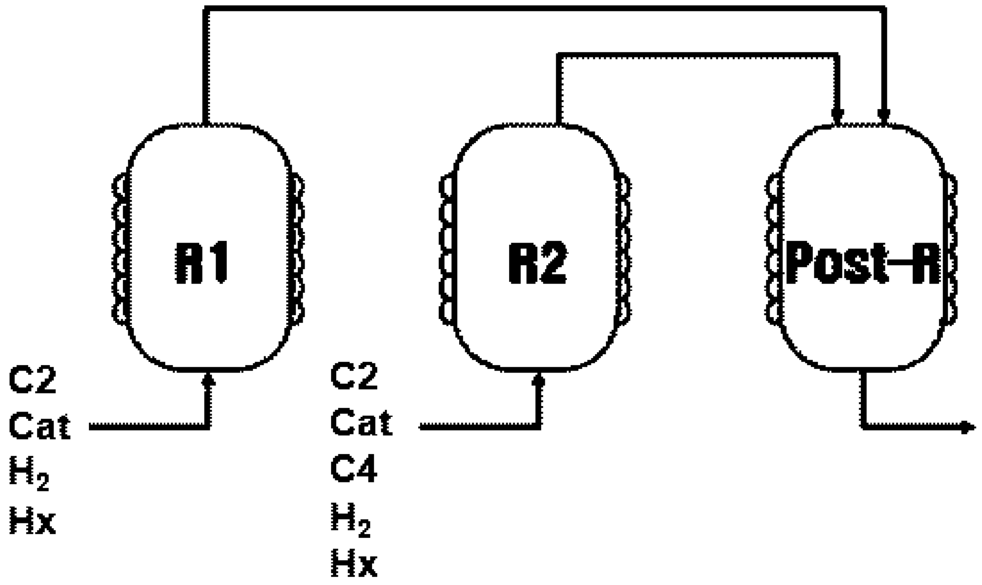
R1
R2
Post-R
C2
Cat
$H_2$
Hx
C2
Cat
C4
$H_2$
Hx

POLYETHYLENE COMPOSITION AND METHOD FOR PREPARING THE SAME

CROSS-REFERENCE TO RELATED APPLICATION(S)

The present application is a national stage entry under 35 U.S.C. § 371 of International Application No. PCT/KR2021/013291 filed on Sep. 29, 2021, which claims priority from Korean Patent Application Nos. 10-2020-0127476 filed on Sep. 29, 2020, and 10-2021-0127982 filed on Sep. 28, 2021, all the disclosures of which are incorporated herein by reference.

TECHNICAL FIELD

The present disclosure relates to a polyethylene composition capable of producing a molded product having excellent environmental stress crack resistance, and improving total volatile organic compound (TVOC) properties that can be generated by a low molecular weight polymer, and a method for preparing the same.

BACKGROUND OF ART

Polyethylene resins are increasingly in demand and are used in a variety of applications. With the demand for high-performance polyethylene for relatively new plastics, polymerization processes have been developed to support the production of new polymeric materials.

Olefin polymerization catalyst systems may be generally divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

The metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are released from a supported component of the resulting catalyst to cause fouling in the reactor.

In particular, when using the existing Ziegler-Natta catalyst, there is a problem in that the final molded product (bottle cap, blow molding container, etc.) contains a low molecular weight lubricant, thereby changing the taste of beverage and causing a bad odor in severe cases. In addition, when total volatile organic compounds (TVOCs) due to low molecular weight are induced in injection processing (200° C.) for manufacturing the final molded product, harmful gases such as harmful fumes may be generated.

In particular, in the case of using polyethylene for the manufacture of general food and drug storage containers or caps, the caps (e.g., bottle caps) of airtight containers containing carbonated beverages must be strong enough to withstand the pressure of carbonated beverages and sufficiently flexible to provide excellent sealing properties. Specifically, rigidity capable of withstanding the internal pressure caused by carbonated beverages in an airtight container, impact resistance at low temperatures, and environmental stress crack resistance are required. However, polyethylene products that are currently widely sold and used have a problem in that low molecular substances contained in the resin composition are transferred to food when used at high temperatures. Further, when stored at low temperatures, polyethylene becomes hard, so that there are problems in that opening and closing properties become poor, physical properties change due to long-term storage, and the products may be easily damaged by impact.

Accordingly, there is a continuous need to develop a polyethylene composition capable of reducing the generation of harmful gases such as total volatile organic compounds (TVOCs) and fumes that may be generated by the polymers in the low molecular weight region while solving the problem of deterioration in sealing performance due to degradation in physical properties during long-term storage, when injection-molded products such as food and drug storage containers or caps are manufactured.

DETAILED DESCRIPTION OF THE INVENTION

Technical Problem

In the present disclosure, there are provided a polyethylene composition capable of producing a molded product having excellent environmental stress crack resistance, and improving total volatile organic compound (TVOC) properties that can be generated by a low molecular weight polymer, and a method for preparing the same.

In the present disclosure, there is also provided an injection-molded product including the above-described polyethylene composition.

Technical Solution

According to an embodiment of the present disclosure, there is provided a polyethylene composition having a linear structural fraction ($R_{OL}$) according to the following Equation 1 of 10% or less and a molecular weight distribution (Mw/Mn) of 12 or less:

$$R_{OL} = (A_1 / A_2) \times 100 \quad \text{[Equation 1]}$$

in Equation 1, $R_{OL}$ represents a linear structural fraction (%) contained in the polyethylene composition, $A_1$ represents a ratio ($A_1$, %) of an integral value in the region where Log MW is less than 3 to an integral value in the entire x-axis in a GPC curve graph having an x-axis of log MW and a y-axis of dw/d log Mw, and $A_2$ represents a ratio ($A_2$, %) of an integral value in the region where Log MW is 3 or more and less than 3.5 to an integral value in the entire x-axis in a GPC curve graph having an x-axis of log MW and a y-axis of dw/d log Mw.

In addition, there is provided a method for preparing the polyethylene composition.

In addition, there is provided an injection-molded product including the polyethylene composition.

Advantageous Effects

In the present disclosure, there are provided a polyethylene composition capable of reducing the generation of harmful gases such as total volatile organic compounds (TVOCs) and fumes that may be generated by low molecular weight polymers, and a method for preparing the same.

BRIEF DESCRIPTION OF THE DRAWINGS

The FIGURE is a schematic diagram exemplarily showing an apparatus and a process for preparing a polyethylene composition of Example 1 according to an embodiment of the present disclosure.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

The terminology "about" or "substantially" is intended to have meanings close to numerical values or ranges specified with an allowable error and intended to prevent accurate or absolute numerical values disclosed for understanding of the present invention from being illegally or unfairly used by any unconscionable third party.

For reference, "part by weight" as used herein refers to a relative concept of a ratio of the weight of the remaining material based on the weight of a specific material. For example, in a mixture containing 50 g of material A, 20 g of material B, and 30 g of material C, the amounts of material B and C based on 100 parts by weight of material A are 40 parts by weight and 60 parts by weight, respectively.

In addition, "wt % (% by weight)" refers to an absolute concept of expressing the weight of a specific material in percentage based on the total weight. In the above-described mixture, the contents of material A, B and C based on 100% of the total weight of the mixture are 50 wt %, 20 wt % and 30 wt %, respectively. At this time, a sum of contents of each component does not exceed 100 wt %.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

According to an embodiment of the present disclosure, there is provided a polyethylene composition capable of producing a molded product having excellent environmental stress crack resistance, and reducing the generation of harmful gases such as total volatile organic compounds (TVOCs) and fumes that may be generated by low molecular weight polymers.

Specifically, the polyethylene composition of the present disclosure has a linear structural fraction ($R_{OL}$) according to the following Equation 1 of 10% or less and a molecular weight distribution (Mw/Mn) of 12 or less:

$$R_{OL} = (A_1 / A_2) \times 100 \quad \text{[Equation 1]}$$

in Equation 1, $R_{OL}$ represents a linear structural fraction (%) contained in the polyethylene composition, $A_1$ represents a ratio ($A_1$, %) of an integral value in the region where Log MW is less than 3 to an integral value in the entire x-axis in a GPC curve graph having an x-axis of log MW and a y-axis of dw/d log Mw, and $A_2$ represents a ratio ($A_2$, %) of an integral value in the region where Log MW is 3 or more and less than 3.5 to an integral value in the entire x-axis in a GPC curve graph having an x-axis of log MW and a y-axis of dw/d log Mw.

In particular, the polyethylene composition is characterized by a large difference between the region where Log MW is 3 or more and less than 3.5 and the region where Log MW is less than 3 in a GPC curve graph having an x-axis of log MW and a y-axis of dw/d log Mw, and this means that the region where log MW is less than 3.0 or Log MW is 2.5 to 3.0, which is the molecular weight level at which volatile organic compounds (VOCs) are generated, is remarkably small. As can be seen in Examples to be described later, when minimizing the ratio of the low molecular weight region (linear polyethylene) measured through GC-Mass in this way, it is possible to significantly reduce the amount of volatile organic compounds (VOCs) generated.

Specifically, the linear structure fraction ($R_{OL}$) according to the Equation 1 may be 10% or less or 3.0% to 10.0%, 9.9% or less or 4% to 9.9%, 9.8% or less or 5% to 9.8%, 9.6% or less or 7% to 9.6%, or 9.5% or less or 7.5% to 9.5%.

In addition, the ratio ($A_1$) of an integral value in the region where Log MW is less than 3 to an integral value in the entire x-axis in a GPC curve graph having an x-axis of log MW and a y-axis of dw/d log Mw may be 0.5% or less or 0.01% to 0.5%, 0.45% or less or 0.03% to 0.45%, 0.43% or less or 0.02% to 0.43%, or 0.4% or less or 0.05% to 0.4%.

In addition, the ratio ($A_2$) of an integral value in the region where Log MW is 3 or more and less than 3.5 to an integral value in the entire x-axis in a GPC curve graph having an x-axis of log MW and a y-axis of dw/d log Mw may be 3.5% to 4.5%, 3.6% to 4.4%, 3.7% to 4.4%, or 3.8% to 4.3%.

In addition, a difference ($A_2-A_1$) between the ratio ($A_1$) of an integral value in the region where Log MW is less than 3 to an integral value in the entire x-axis and the ratio ($A_2$) of an integral value in the region where Log MW is 3 or more and less than 3.5 to an integral value in the entire x-axis may be 3.0% to 4.0%, 3.2% to 4.0%, 3.3% to 3.9%, or 3.5% to 3.9%, in a GPC curve graph having an x-axis of log MW and a y-axis of dw/dlog Mw.

In addition, a ratio ($A_3$) of an integral value in the region where Log MW is 5.5 or more to an integral value in the entire x-axis in a GPC curve graph having an x-axis of log MW and a y-axis of dw/d log Mw may be 11.5% or more or 11.5% to 18%, 11.8% or more or 11.8% to 17%, 12% or more or 12% to 16%, 12.3% or more or 12.3% to 15%, or 12.5% or more or 12.5% to 14%.

In order to achieve excellent environmental stress crack resistance during the manufacture of injection-molded products such as a food and drug storage container or a cap, and significantly reduce the generation of volatile organic compounds (VOCs) by optimizing the molecular structure, the polyethylene composition has the area ratio in the GPC curve graph as described above. In particular, when reducing the low-molecular region in the GPC curve graph and minimizing the ratio between specific regions, uniform physical properties and excellent processability can be secured, and VOCs may be reduced.

Meanwhile, the polyethylene composition of the present disclosure is prepared by using a catalyst containing a specific metallocene compound as will be described later, so that chain propagation and chain transfer rate are almost constant, thereby having a narrow molecular weight distribution.

Specifically, the polyethylene composition may have a molecular weight distribution (Mw/Mn) of 12 or less or 8.0 to 12.0, 11.9 or less or 8.5 to 11.9, 11.8 or less or 9 to 11.8, or 11.5 or less or 10 to 11.5. Since the polyethylene composition has the narrow molecular weight distribution as described above, it is possible to effectively reduce TVOCs caused by low molecular weight in the injection molding process for producing a molded product.

In addition, the polyethylene composition may have a weight average molecular weight of 125000 g/mol to 250000 g/mol, 130000 g/mol to 180000 g/mol, or 135000 g/mol to 150000 g/mol.

In the present disclosure, the weight average molecular weight (Mw) and the number average molecular weight (Mn) are molecular weights converted with standard polystyrene measured by gel permeation chromatography (GPC, manufactured by Water). However, the weight average molecular weight is not limited thereto and may be measured by other methods known in the art to which the present invention pertains.

Further, the polyethylene composition is a high-density polyethylene composition having a density (ASTM D 1505, 23° C.) of 0.945 $g/cm^3$ to 0.965 $g/cm^3$. The density may preferably be 0.950 $g/cm^3$ to 0.963 $g/cm^3$, 0.952 $g/cm^3$ to 0.962 $g/cm^3$, 0.953 $g/cm^3$ to 0.960 $g/cm^3$, 0.953 $g/cm^3$ to 0.958 $g/cm^3$, or 0.954 $g/cm^3$ to 0.958 $g/cm^3$.

In addition, the polyethylene composition may have a melt index (ASTM D 1238, 190° C., 2.16 kg) of 0.01 g/10 min to 0.45 g/10 min, 0.05 g/10 min to 0.4 g/10 min, 0.1 g/10 min to 0.38 g/10 min, 0.2 g/10 min to 0.36 g/10 min, or 0.25 g/10 min to 0.35 g/10 min.

In addition, the composition may have a melt flow rate (MFRR, $MI_5/MI_{2.16}$) of 4.2 or more or 4.2 to 5, 4.22 or more or 4.22 to 4.8, or 4.24 or more or 4.24 to 4.5.

In addition, the polyethylene composition may have a melting temperature (Tm) of 128° C. to 135° C., 128.5° C. to 134° C., or 129° C. to 132° C.

For example, the melting temperature (Tm) of the polyethylene composition may be measured using a differential scanning calorimeter (DSC). For example, the melting temperature of the polymer is measured using a differential scanning calorimeter (DSC, DSC 2920, manufactured by TA instrument). After heating the polyethylene composition to 200° C., the temperature is maintained at that temperature for 5 minutes, and then lowered to 30° C. Thereafter, the temperature was increased again, and the temperature at the top of the DSC curve is measured as Tm. Herein, the temperature is increased and lowered at a rate of 10° C./min, respectively. Tm is measured in the section where the temperature rises for the second time. A specific measurement method may be understood with reference to Test Example 1 below.

Meanwhile, the polyethylene composition of the present disclosure includes an ethylene homopolymer and a copolymer of ethylene and a $C_{4-12}$ alpha-olefin monomer, and preferably includes the ethylene homopolymer and the ethylene copolymer in a weight ratio of 99:1 to 99.5:0.5.

For example, the alpha-olefin is at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene, and may preferably be 1-butene.

In addition, the polyethylene composition according to the present disclosure optimizes the molecular structure with a narrow molecular weight distribution to reduce the low molecular weight region in the GPC curve graph and minimize the ratio between specific regions. Therefore, it is possible to secure excellent environmental stress crack resistance during processing of injection-molded products, and significantly reduce the generation of harmful gases such as total volatile organic compounds (TVOCs) and fumes.

For example, in the polyethylene composition, the content of total volatile organic compounds (TVOCs) measured at 200° C. for 10 minutes using a gas chromatography-mass spectrometer (JTD-GC/MS-02) may be 100 μg/g or less or 0.01 to 100 μg/g, 90 μg/g or less or 0.1 to 90 μg/g, 85 μg/g or less or 0.2 to 85 μg/g, 82 μg/g or less or 0.2 to 82 μg/g, or 75 μg/g or less or 0.2 to 75 μg/g. The content of total volatile organic compounds (TVOCs) may be measured by applying various methods known as mass spectrometry for gaseous elements, and a specific measurement method may be understood with reference to Test Example 1 below.

According to another embodiment of the present disclosure, there is provided a method for preparing the above-described polyethylene composition.

According to another embodiment of the present disclosure, there is provided a method for effectively preparing the polyethylene composition capable of producing a molded product having excellent environmental stress crack resistance, and reducing the generation of harmful gases such as total volatile organic compounds (TVOCs) and fumes that may be generated by low molecular weight polymers.

The polyethylene composition according to the present disclosure may be prepared by polymerizing ethylene in the presence of at least one first metallocene compound represented by the following Chemical Formula 1; and at least one second metallocene compound selected from the compounds represented by the following Chemical Formula 2.

$$(Cp^1R^a)_n(Cp^2R^b)M^1Z^1_{3-n}$$ [Chemical Formula 1]

in Chemical Formula 1, $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radical, wherein they may be substituted with $C_{1-20}$ hydrocarbon;

$R^a$ and $R^b$ are the same as or different from each other, and each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ are each independently a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy; and n is 1 or 0;

[Chemical Formula 2]

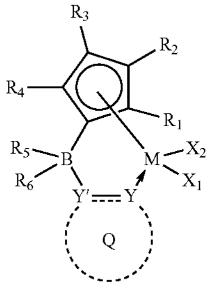

in Chemical Formula 2,

B is boron,

M is a group 4 transition metal, $R_1$ to $R_4$ are the same as or different from each other, and are each independently hydrogen, $C_{1-20}$ alkyl, $C_{3-20}$ cycloalkyl, or $C_{6-20}$ aryl, or at least one pair of $R_1$ and $R_2$ or $R_3$ and $R_4$ is bonded to each other to independently form a substituted or unsubstituted $C_{6-60}$ aromatic ring, $R_5$ and $R_6$ are the same as or different from each other, and are each independently $C_{1-20}$ alkyl, $C_{3-20}$ cycloalkyl, or $C_{6-20}$ aryl, or $R_5$ and $R_6$ are bonded to each other to form a $C_{3-60}$ aliphatic ring or a $C_{6-60}$ aromatic ring, $X_1$ and $X_2$ are the same as or different from each other, and are each independently $C_{1-20}$ alkyl or —O(CO)R', wherein R' is $C_{1-20}$ alkyl, Q is a substituted or unsubstituted $C_{2-60}$ heterocyclic ring containing at least one selected from the group consisting of N, O and S, Y and Y' are elements constituting Q, Y is N, O, or S, and Y' is N or C, wherein Y' is adjacent to Y.

Unless otherwise specified herein, following terms may be defined as follows.

The hydrocarbyl group is a monovalent functional group in a hydrogen-removed form from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. The C1 to C30 hydrocarbyl group may be a C1 to C20 or C1 to C10 hydrocarbyl group. For example, the hydrocarbyl group may be a linear, branched or cyclic alkyl. More specifically, the C1 to C30 hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

The hydrocarbyloxy group is a functional group in which the hydrocarbyl group is bonded to oxygen. Specifically, the C1 to C30 hydrocarbyloxy group may be a C1 to C20 or C1 to C10 hydrocarbyloxy group. For example, the hydrocarbyloxy group may be a linear, branched or cyclic alkyl. More specifically, the C1 to C30 hydrocarbyloxy group may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexyloxy group, an n-heptoxy group and a cyclohexyloxy group; or an aryloxy group such as a phenoxy group and a naphthalenoxy group.

The hydrocarbyloxyhydrocarbyl group is a functional group in which at least one hydrogen of the hydrocarbyl group is substituted with at least one hydrocarbyloxy group. Specifically, the C2 to C30 hydrocarbyloxyhydrocarbyl group may be a C2 to C20 or C2 to C15 hydrocarbyloxyhydrocarbyl group. For example, the hydrocarbyloxyhydrocarbyl group may be a linear, branched or cyclic alkyl. More specifically, the C2 to C30 hydrocarbyloxyhydrocarbyl group may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group and a tert-butoxyhexyl group; or an aryloxyalkyl group such as a phenoxyhexyl group.

The hydrocarbyl(oxy)silyl group is a functional group in which one to three hydrogens of —$SiH_3$ are substituted with one to three hydrocarbyl or hydrocarbyloxy groups. Specifically, the C1 to C30 hydrocarbyl(oxy)silyl group may be a C1 to C20, C1 to C15, C1 to C10, or C1 to C5 hydrocarbyl(oxy)silyl group. More specifically, the C1 to C30 hydrocarbyl(oxy)silyl group may be an alkylsilyl group such as a methylsilyl group, a dimethylsilyl group, a trimethylsilyl group, a dimethylethylsilyl group, a diethylmethylsilyl group, or a dimethylpropylsilyl group; an alkoxysilyl group such as a methoxysilyl group, a dimethoxysilyl group, a trimethoxysilyl group, or a dimethoxyethoxysilyl group; or an alkoxyalkylsilyl group such as a methoxydimethylsilyl group, a diethoxymethylsilyl group, or a dimethoxypropylsilyl group.

The C1 to C20 silylhydrocarbyl group is a functional group in which at least one hydrogen of the hydrocarbyl group is substituted with a silyl group. The silyl group may be —$SiH_3$ or a hydrocarbyl(oxy)silyl group. Specifically, the C1 to C20 silylhydrocarbyl group may be a C1 to C15 or C1 to C10 silylhydrocarbyl group. More specifically, C1 to C20 silylhydrocarbyl group may be a silylalkyl group such as —$CH_2$—$SiH_3$; an alkylsilylalkyl group such as a methylsilylmethyl group, a methylsilylethyl group, a dimethylsilylmethyl group, a trimethylsilylmethyl group, a dimethylethylsilylmethyl group, a diethylmethylsilylmethyl group, or a dimethylpropylsilylmethyl group; or an alkoxysilylalkyl group such as a dimethylethoxysilylpropyl group.

The halogen may be fluorine (F), chlorine (Cl), bromine (Br) or iodine (I).

The sulfonate group has a structure of —O—$SO_2$—$R^c$, and $R^c$ may be a C1 to C30 hydrocarbyl group. Specifically, the C1 to C30 sulfonate group may be a methylsulfonate group, a phenylsulfonate group, or the like.

The C1 to C30 sulfone group has a structure of —$R^{c'}$—$SO_2$—$R^{c''}$, and $R^{c'}$ and $R^{c''}$ may be the same as or different from each other, and may each independently be any one of a C1 to C30 hydrocarbyl group. Specifically, the C1 to C30 sulfone group may be a methylsulfonylmethyl group, a methylsulfonylpropyl group, a methylsulfonylbutyl group, a phenylsulfonylpropyl group, or the like.

In this disclosure, "two neighboring substituents are connected with each other to form an aliphatic or aromatic ring" means that the atom(s) of two substituents and the atom(s) to which the two substituents are bonded are connected with each other to form a ring. Specifically, examples in which $R^e$ and $R^f$ or $R^{e'}$ and $R^{f'}$ of —$NR^eR^f$ or —$NR^{e'}R^{f'}$ are connected with each other, and along with N to which they are attached to form an aliphatic ring include a piperidinyl group, and examples in which $R^e$ and $R^f$ or $R^{e'}$ and $R^{f'}$ of —$NR^eR^f$ or —$NR^{e'}R^{f'}$ are connected with each other, and along with N to which they are attached to form an aromatic ring include a pyrrolyl group.

Meanwhile, the alkyl may be linear or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, $C_{1-20}$ alkyl may be a methyl group, an ethyl group, an n-propyl group, an iso-propyl group, an n-butyl group, an iso-butyl group, a tert-butyl group, an n-pentyl group, or an iso-pentyl group, but the present disclosure is not limited thereto. Meanwhile, as used herein, "iPr" refers to an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, it may be cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, or the like, but the present disclosure is not limited thereto. Meanwhile, as used herein, "Cy" refers to C3 to C6 cycloalkyl.

Meanwhile, the alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl, cyclohexenyl, or the like.

The alkoxy may be a linear, branched, or cyclic alkoxy group. Specifically, the $C_{1-20}$ alkoxy may be a $C_{1-20}$ linear alkoxy group; a $C_{1-10}$ linear alkoxy group; a $C_{1-5}$ linear alkoxy group; a $C_{3-20}$ branched or cyclic alkoxy group; a $C_{3-15}$ branched or cyclic alkoxy group; or a $C_{3-10}$ branched or cyclic alkoxy group. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, or cyclohexyloxy, but the present disclosure is not limited thereto.

The alkoxyalkyl may have a structure including —$R^g$—O—$R^h$, and may be a substituent in which one or more hydrogens of alkyl (—$R^g$) are substituted with alkoxy (—O—$R^h$). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, or the like.

The aryl may be a monocyclic, bicyclic or tricyclic aromatic hydrocarbon. According to an embodiment of the present disclosure, the aryl may have 6 to 60 carbon atoms, 6 to 40 carbon atoms, 6 to 20 carbon atoms, or 6 to 15 carbon atoms. Specifically, the aryl may be phenyl, biphenyl, naphthyl, anthracenyl, phenanthrenyl, fluorenyl, or the like, but is not limited thereto.

The aryloxy is a functional group in which the above-described aryl group is bonded to oxygen. Specifically, the aryloxy may have 6 to 60 carbon atoms, 6 to 40 carbon atoms, 6 to 20 carbon atoms, or 6 to 15 carbon atoms. More specifically, the aryloxy may be phenoxy, biphenoxyl, naphthoxy, or the like, but is not limited thereto.

The alkylaryl may be a substituent in which one or more hydrogens of the aryl is substituted with alkyl. For example, the $C_{7-20}$ alkylaryl may be methylphenyl, ethylphenyl, methylbiphenyl, methylnaphthyl, or the like, but is not limited thereto.

The arylalkyl may be a substituent in which one or more hydrogens of the alkyl is substituted with aryl. For example, the $C_{7-20}$ arylalkyl may be phenylmethyl, phenylethyl, biphenylmethyl, naphthylmethyl, or the like, but is not limited thereto.

In addition, the $C_{6-20}$ arylene or arylidene is the same as the above-mentioned aryl except that it is a divalent substituent. Specifically, it may be phenylene, biphenylene, naphthylene, anthracenylene, phenanthrenylene, fluorenylene, or the like, but is not limited thereto.

The heteroaryl is heteroaryl containing at least one of O, N, and S as a heterogeneous element, and may have 2 to 60 carbon atoms, or 2 to 20 carbon atoms, although the number of carbon atoms is not particularly limited. Specifically, it may be xanthene, thioxanthen, a thiophene group, a furan group, a pyrrole group, an imidazole group, a thiazole group, an oxazole group, an oxadiazole group, a triazole group, a pyridyl group, a bipyridyl group, a pyridinyl group, a pyrimidyl group, a triazine group, an acridyl group, a pyridazine group, a pyrazinyl group, a quinolinyl group, a quinazoline group, a quinoxalinyl group, a phthalazinyl group, a pyrido-pyrimidinyl group, a pyrido-pyrazinyl group, a pyrazino-pyrazinyl group, an isoquinoline group, an indole group, a carbazole group, a benzoxazole group, a benzoimidazole group, a benzothiazole group, a benzocarbazole group, a benzothiophene group, a dibenzothiophene group, a benzofuranyl group, a phenanthroline group, an isoxazolyl group, a thiadiazolyl group, a phenothiazinyl group, a dibenzofuranyl group, or the like, but the present disclosure is not limited thereto.

In addition, the heterocyclic ring includes both an aliphatic ring containing at least one selected from the group consisting of N, O and S and an aromatic ring containing at least one selected from the group consisting of N, O and S.

In addition, the Group 4 transition metal may be titanium (Ti), zirconium (Zr), hafnium (Hf), or rutherpodium (Rf), and specifically titanium (Ti), zirconium (Zr), or hafnium (Hf). More specifically, it may be zirconium (Zr) or hafnium (Hf), but is not limited thereto.

In addition, the group 13 element may be boron (B), aluminum (Al), gallium (Ga), indium (In), or thallium (Tl), and specifically, boron (B), or aluminum (Al). But it is not limited thereto.

The above-mentioned substituents may be optionally substituted with one or more substituents selected from the group consisting of a hydroxyl group; halogen; alkyl or alkenyl, aryl, alkoxy; alkyl or alkenyl, aryl, alkoxy containing at least one heteroatom of Group 14 to 16 heteroatoms; amino; silyl; alkylsilyl or alkoxysilyl; a phosphine group; a phosphide group; a sulfonate group; and a sulfone group within the range of exhibiting the same or similar effects as the desired effects.

The metallocene catalyst for ethylene polymerization of the present disclosure may include at least one first metallocene compound represented by the Chemical Formula 1 and at least one second metallocene compound represented by the Chemical Formula 2 as a catalyst precursor.

Specifically, in Chemical Formula 1, $M^1$ may be zirconium (Zr) or hafnium (Hf), and preferably zirconium (Zr). Further, each of $Cp^1$ and $Cp^2$ may be cyclopentadienyl, indenyl, or fluorenyl. In addition, each of $R^a$ and $R^b$ may be hydrogen, $C_{1-6}$ alkyl, $C_{7-12}$ arylalkyl, $C_{2-12}$ alkoxyalkyl, $C_{6-12}$ aryl, or $C_{2-6}$ alkenyl, and preferably be hydrogen, methyl, ethyl, propyl, isopropyl, n-butyl, tert-butyl, pentyl, hexyl, butenyl, phenyl, phenyl-substituted methyl, phenyl-substituted butyl, or tert-butoxyhexyl. In addition, each $Z^1$ may be a halogen atom, and preferably be chlorine (Cl). In addition, n may be 1.

The compound represented by the Chemical Formula 1 may be, for example, a compound represented by one of the following structural formulae, but is not limited thereto.

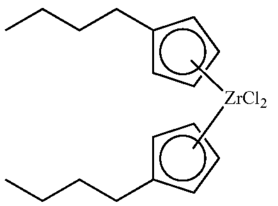

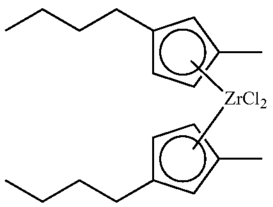

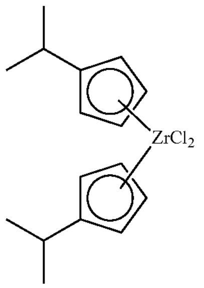

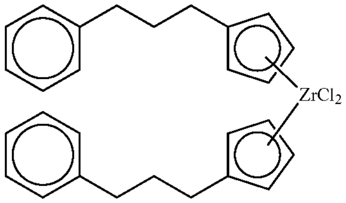

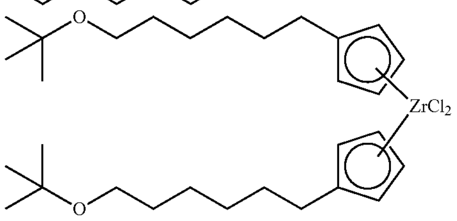

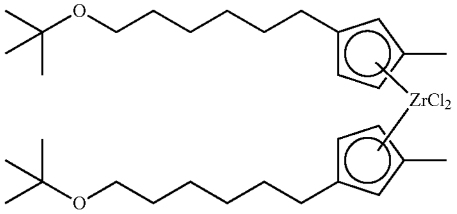

-continued

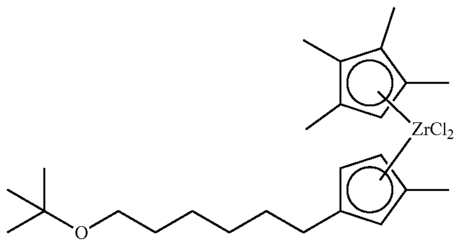

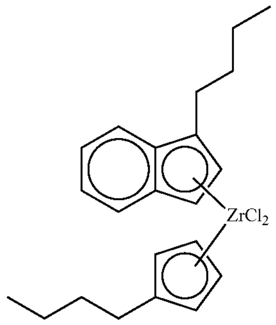

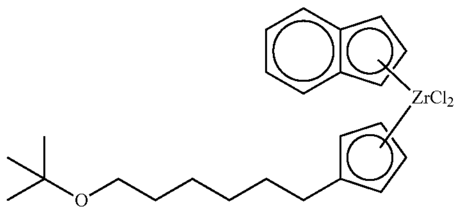

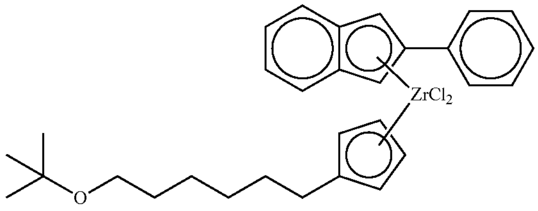

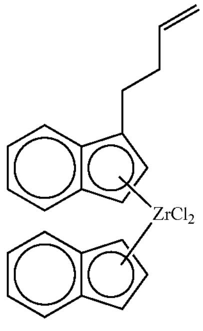

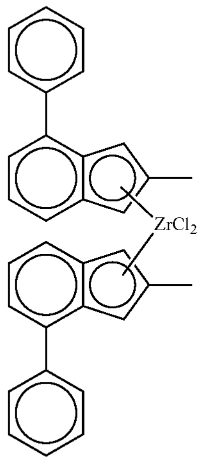

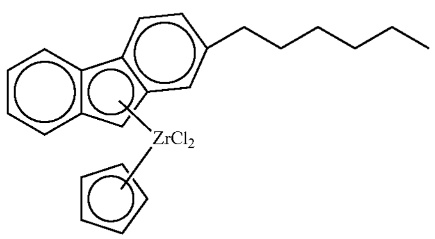

-continued

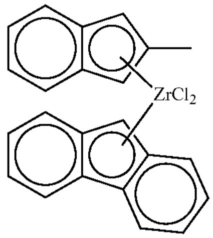

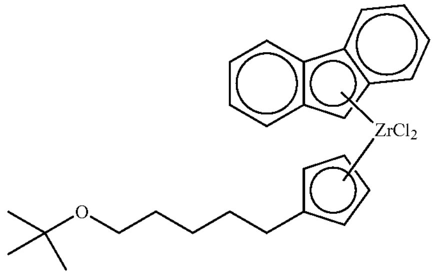

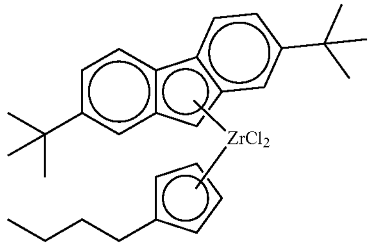

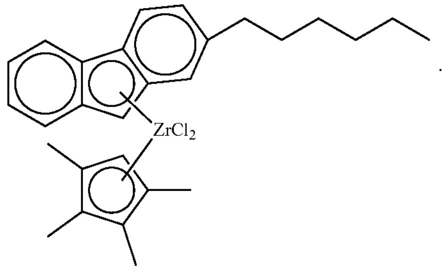

The first metallocene compound represented by the Chemical Formula 1 may be synthesized by applying known reactions, and a more detailed synthesis method may be understood with reference to Examples.

Meanwhile, the polyethylene composition according to the present disclosure may be prepared by polymerizing ethylene in the presence of a catalyst containing at least one second metallocene compound represented by the following Chemical Formula 2 together with at least one first metallocene compound as a catalyst precursor.

The metallocene compound represented by the Chemical Formula 2 employs a bridge structure including a boron anion, unlike the conventionally used CGC (constrained geometry catalyst) type precursor. The conventional CGC type precursor has a neutral bridge structure including silicon, so that the ligand unit is negatively charged. This leads to a structural limitation, and there is a problem in that it is difficult to achieve various physical properties when preparing an olefin polymer.

On the other hand, the metallocene compound represented by the Chemical Formula 2 according to the present disclosure may have a neutral ligand unit, because the bridge structure is negatively charged. The ligand unit of the present disclosure is a heterocyclic ring Q of Chemical Formula 2, wherein Y, which is an element of Q, is coordinated with a metal, and Y', which is an element of Q and adjacent to Y, is connected to a bridge. Accordingly, as the present disclosure employs various neutral ligand units satisfying the above structure, a catalyst having higher activity and higher comonomer incorporation than the conventional CGC precursor can be prepared.

In addition, alkyl or carboxylate is included as a metal substituent of the metallocene compound represented by the Chemical Formula 2, which acts as a good leaving group to promote a reaction with a cocatalyst such as MAO, thereby increasing activity.

Specifically, in Chemical Formula 2, M may be zirconium (Zr).

In addition, in Chemical Formula 2, $R_1$ to $R_4$ may each independently be hydrogen, $C_{1-10}$ alkyl, or $C_{6-20}$ aryl, or at least one pair of $R_1$ to $R_4$ is bonded to each other to form a substituted or unsubstituted $C_{6-20}$ aromatic ring. For example, $R_1$ and $R_2$ or $R_3$ and $R_4$ may each independently be bonded to each other to form a substituted or unsubstituted $C_{6-20}$ aromatic ring, $R_1$ and $R_2$ may each independently be bonded to each other to form a substituted or unsubstituted $C_{6-20}$ aromatic ring, or $R_3$ and $R_4$ may each independently be bonded to each other to form a substituted or unsubstituted $C_{6-20}$ aromatic ring. Preferably, $R_1$ to $R_4$ may each independently be hydrogen or methyl, or at least one pair of $R_1$ and $R_2$ or $R_3$ and $R_4$ is bonded to each other to form a benzene ring or a 1,2,3,4-tetrahydronaphthalene ring, wherein the benzene ring or the 1,2,3,4-tetrahydronaphthalene ring is unsubstituted or substituted with one to four substituents selected from the group consisting of methyl, tertbutyl and 4-tertbutyl phenyl.

In addition, in Chemical Formula 2, $R_5$ and $R_6$ may each independently be $C_{1-10}$ alkyl, or $C_{6-20}$ aryl, or $R_5$ and $R_6$ may be bonded to each other to form a $C_{3-20}$ aliphatic ring or a $C_{6-20}$ aromatic ring. Preferably, $R_5$ and $R_6$ may each independently be methyl or phenyl, or $R_5$ and $R_6$ may be bonded to each other to form a cyclooctane ring.

More preferably, each of $R_5$ and $R_6$ may be phenyl.

In addition, in Chemical Formula 2, $X_1$ and $X_2$ may each independently be methyl or acetate.

In addition, in Chemical Formula 2, R' may be methyl.

In addition, in Chemical Formula 2, $X_1$ and $X_2$ may be the same.

In addition, in Chemical Formula 2, Q may be a substituted or unsubstituted $C_{2-20}$ heterocyclic ring containing at least one selected from the group consisting of N, O and S. Preferably, Q may be a pyridine ring, a quinoline ring, a 4,5-dihydrooxazole ring, a pyrazole ring, or a benzoxazole ring, wherein Q may be unsubstituted or substituted with one to four substituents selected from the group consisting of methyl, isopropyl and diphenylamino. More preferably, Q may be a pyridine ring, a 4,5-dihydrooxazole ring, a pyrazole ring, or a benzoxazole ring, wherein Q is unsubstituted or substituted with one to four substituents selected from the group consisting of methyl, isopropyl and diphenylamino.

In addition, in Chemical Formula 2, Y is a hetero atom coordinated with the metal M. Preferably, Y may be N.

Meanwhile, specific examples of the second metallocene compound represented by the Chemical Formula 2 may include compounds represented by the following structural formulae, but the present disclosure is not limited thereto:

-continued
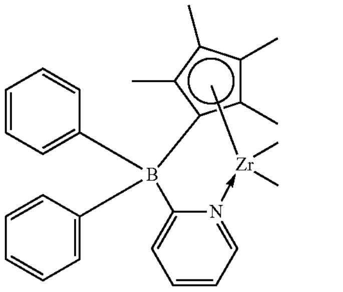
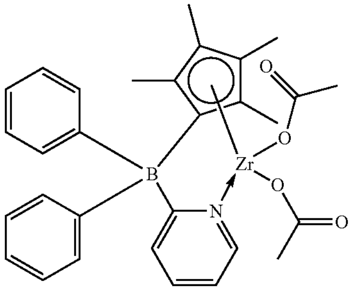
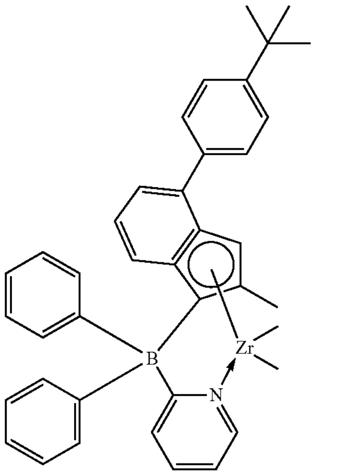
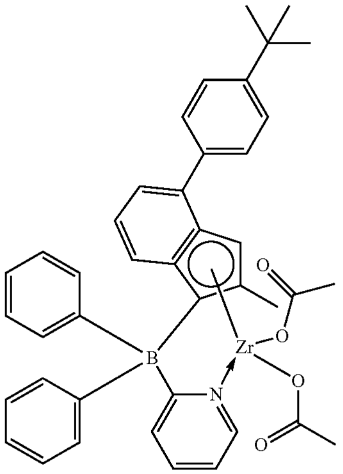
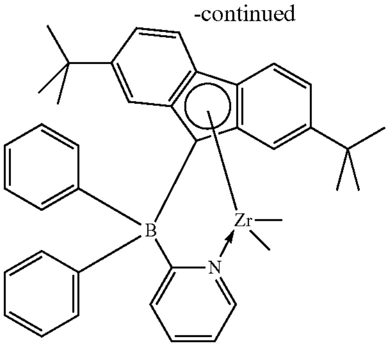
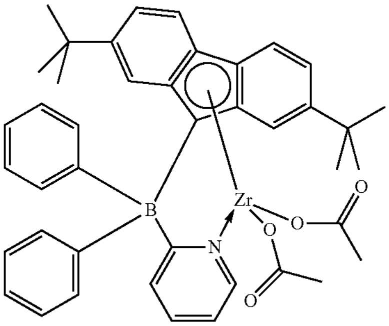
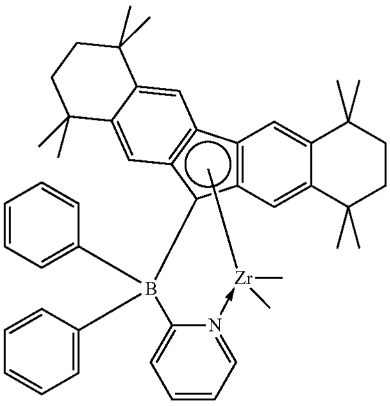
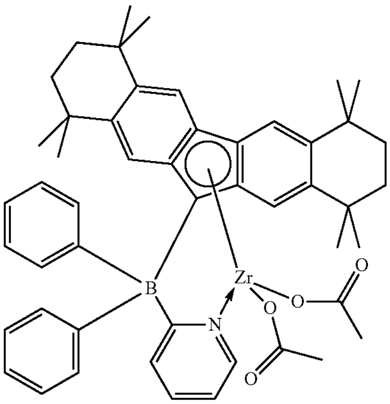

-continued
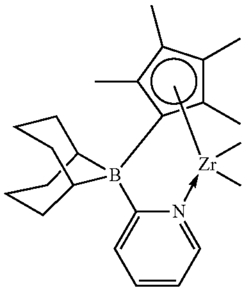
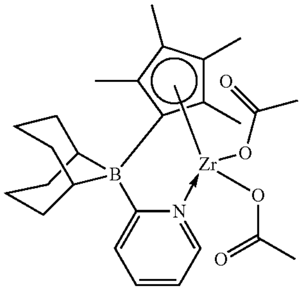
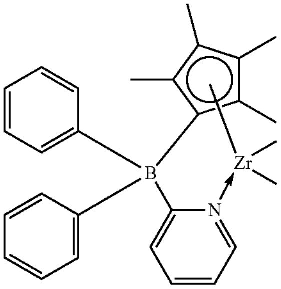
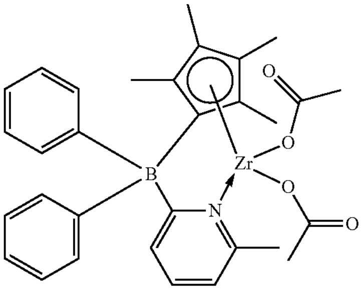
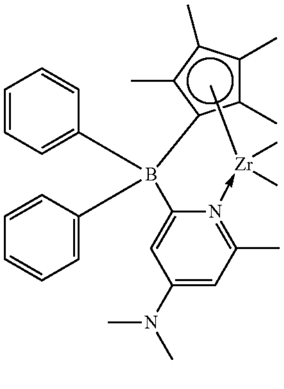
-continued
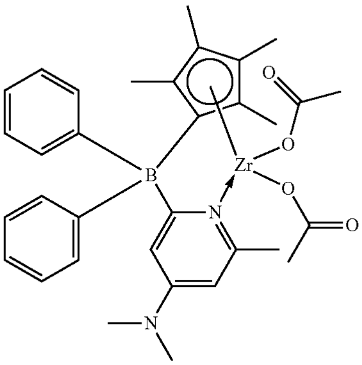
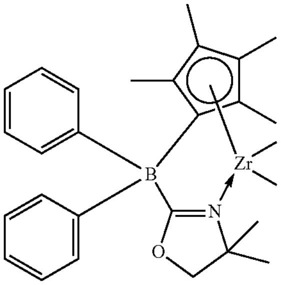
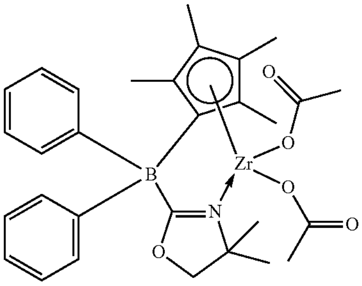
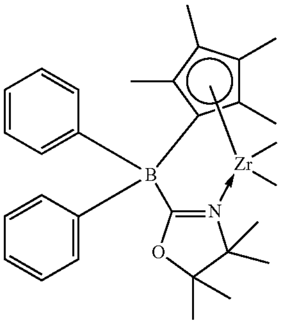
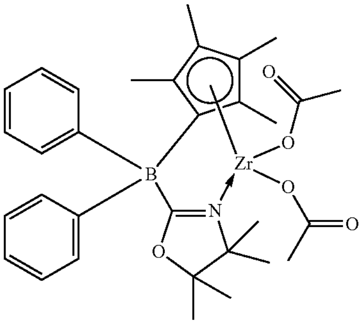

-continued

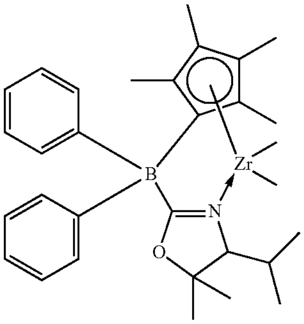

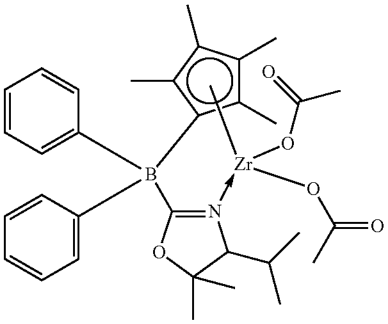

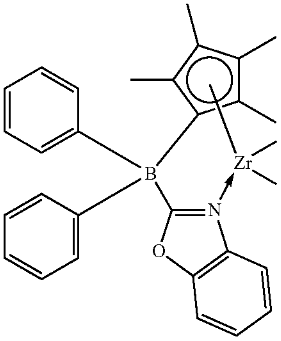

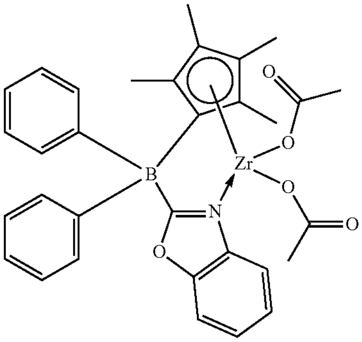

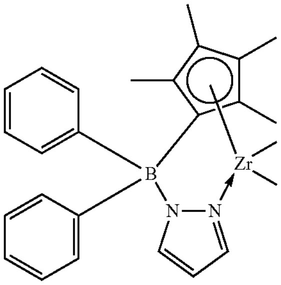

-continued

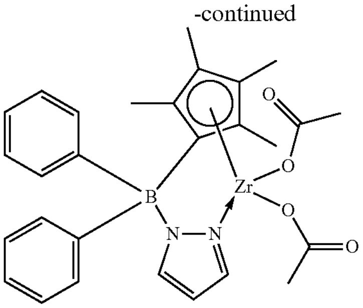

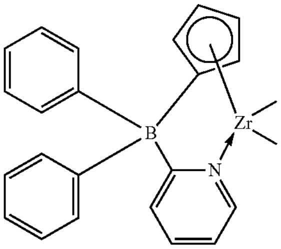

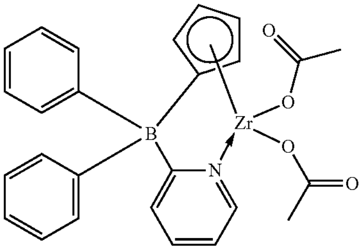

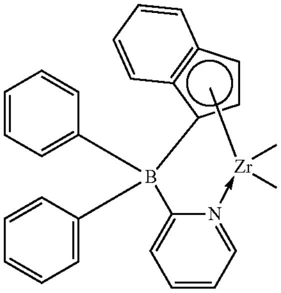

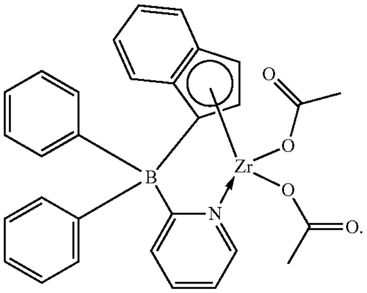

The second metallocene compound represented by the Chemical Formula 2 may be synthesized by applying known reactions, and a more detailed synthesis method may be understood with reference to Examples.

The molar ratio of the first metallocene compound and the second metallocene compound (the first metallocene compound: the second metallocene compound) may be 1:2 to 1:5, 1:2 to 1:4; 1:2 to 1:3, or 1:2 to 1:2.5. The molar ratio of the catalyst precursor may be the same as described above to optimize the molecular structure according to the molecular weight deviation of the precursor.

In particular, the metallocene catalyst of the present disclosure is a hybrid supported catalyst in which at least one first metallocene compound represented by the Chemical Formula 1 and at least one second metallocene compound represented by the Chemical Formula 2 are supported. When a supported metallocene catalyst is used, morphology and physical properties of the polyethylene to be prepared are excellent, and it may be suitably used in the conventional slurry polymerization, bulk polymerization, or gas phase polymerization process.

Specifically, the support may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at a high temperature, silica-alumina, or silica-magnesia, and it may usually contain oxides, carbonates, sulfates, or nitrates such as $Na_2O$, $K_2CO_3$, $BaSO_4$, $Mg(NO_3)_2$ and the like.

The support is preferably calcined or dried at about 200 to 600° C., and more preferably at about 250 to 600° C. When the temperature is low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is excessively high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

The amount of hydroxyl groups on the surface may preferably be 0.1 to 10 mmol/g, or 0.5 to 5 mmol/g. The amount of hydroxyl groups on the surface may be controlled by the preparation method, the preparation conditions, or the drying conditions such as temperature, time, vacuum or spray drying of the support.

When the amount of hydroxyl groups is less than 0.1 mmol/g, reactive sites with cocatalyst may be insufficient. When the amount of hydroxyl groups is more than 10 mmol/g, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the propylene, because the silica support and the functional group of the compound of Chemical Formula 1 are supported by chemical bonding. As a result, when the polyethylene is prepared by slurry polymerization or gas phase polymerization, a fouling phenomenon, sticking to the wall surface of the reactor or with each other, may be minimized.

In addition, when supported on a support, the total content of the first metallocene compound of Chemical Formula 1 and the second metallocene compound of Chemical Formula 2 may be about 10 μmol or more, or about 30 μmol or more, and about 100 μmol or less, or about 80 μmol or less based on a weight of the support, for example, 1 g of silica. When supported within the above content range, the supported catalyst may exhibit appropriate activity, which is advantageous in terms of maintaining catalytic activity and economic feasibility.

In addition, the catalyst composition may further include at least one cocatalyst together with the above-described metallocene compound and the support.

The cocatalyst may be any cocatalyst used for polymerizing olefins in the presence of a general metallocene catalyst. This cocatalyst causes a bond to be formed between the hydroxyl group on the support and the Group 13 transition metal. In addition, since the cocatalyst is present only on the surface of the support, it can contribute to securing intrinsic properties of the specific hybrid catalyst composition of the present disclosure without a fouling phenomenon, sticking to the wall surface of the reactor or with each other.

In addition, the catalyst composition according to the present disclosure may include at least one cocatalyst compound selected from the group consisting of compounds represented by the following Chemical Formulae 3 to 5 in addition to the metallocene compound.

$$-[Al(R_{31})-O]_m- \quad \text{[Chemical Formula 3]}$$

in Chemical Formula 3, $R_{31}$ are each independently halogen, or $C_{1-20}$ hydrocarbyl unsubstituted or substituted with halogen; and m is an integer of 2 or more, $$D(R_{41})_3 \quad \text{[Chemical Formula 4]}$$

in Chemical Formula 4,

D is aluminum or boron, and $R_{41}$ are each independently halogen; or $C_{1-20}$ hydrocarbyl unsubstituted or substituted with halogen; and $$[L\text{-}H]^+[EA_4]^- \text{or } [L]^+[EA_4]^- \quad \text{[Chemical Formula 5]}$$

in Chemical Formula 5,

L is a neutral or cationic Lewis base;

$[L\text{-}H]^+$ is a Brønsted acid;

E is a Group 13 element; and

A are each independently substituted or unsubstituted $C_{6-20}$ aryl or substituted or unsubstituted $C_{1-20}$ alkyl, wherein the $C_{6-40}$ aryl or $C_{1-20}$ alkyl is unsubstituted or substituted with at least one substituent selected from the group consisting of halogen, $C_{1-20}$ alkyl, $C_{1-20}$ alkoxy and $C_{6-20}$ aryloxy.

The compound represented by the Chemical Formula 3 may function as an alkylating agent and an activating agent, the compound represented by the Chemical Formula 4 may function as an alkylating agent, and the compound represented by the Chemical Formula 5 may function as an activating agent.

The compound represented by the Chemical Formula 3 is not particularly limited as long as it is alkylaluminoxane, but may be, for example, methylaluminoxane, ethylaluminoxane, isobutylaluminoxane, butylaluminoxane, and the like. Preferably, it may be methylaluminoxane.

The compound represented by the Chemical Formula 4 is not particularly limited as long as it is an alkyl metal compound, but may be, for example, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like. Preferably, it may be selected from trimethylaluminum, triethylaluminum, and triisobutylaluminum.

Examples of the compound represented by the Chemical Formula 5 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-dimethylanilinium tetrapentafluorophenylboron, N,N-diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-dimethylanilinium tetraphenylaluminum, N,N-dimethylanilinium tetrapentafluorophenylaluminum, N,N-diethylammonium tetrapentaphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like. Preferably, aluminoxane may be used, and more preferably, methylaluminoxane (MAO), which is alkyl aluminoxane, may be used.

In addition, in the catalyst composition, a molar ratio of the cocatalyst and a sum of the first metallocene compound of Chemical Formula 1 and the second metallocene compound of Chemical Formula 2 may be about 1:1 to about 1:10000 (cocatalyst: sum of first and second metallocene compounds). The molar ratio may preferably be about 1:1 to about 1:1000, and may more preferably be about 1:10 to about 1:100. When the molar ratio is less than about 1, the metal content of the cocatalyst is too small, so the catalytically active species is not well made, resulting in low activity. When the molar ratio exceeds about 10000, the metal of the cocatalyst may act as a catalyst poison.

The cocatalyst may be supported in an amount of about 3 mmol to 25 mmol, or about 5 mmol to 20 mmol based on 1 g of the support.

Meanwhile, the catalyst composition may be prepared by a method including the steps of: supporting a cocatalyst on a support; supporting a metallocene compound on the support where the cocatalyst is supported; and preparing a catalyst including the support where the cocatalyst and the metallocene compound are supported.

In the above method, the supporting conditions are not particularly limited and the supporting step may be performed within a range well known to those skilled in the art. For example, the supporting step may be performed at a high temperature and at a low temperature appropriately. For example, the supporting temperature may be in a range of about −30° C. to 150° C., preferably in a range of about 50° C. to 98° C., or about 55° C. to 95° C. The supporting time may be appropriately controlled depending on the amount of the first metallocene compound to be supported. The reacted supported catalyst may be used as it is after removing the reaction solvent by filtration or distillation under reduced pressure, or subjected to Soxhlet filtering using aromatic hydrocarbon such as toluene, if necessary.

The preparation of the supported catalyst may be performed in the presence of a solvent or without a solvent. When the solvent is used, it may include C5 to C12 aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. It is preferable to use hexane, heptane, toluene, or dichloromethane. The solvent used herein is preferably used after removing a small amount of water or air, which acts as a catalyst poison, by treating with a small amount of alkyl aluminum. It is also possible to further use the cocatalyst.

Meanwhile, the polyethylene composition according to the present disclosure is prepared by polymerizing ethylene while introducing hydrogen gas in the presence of the above-described metallocene catalyst.

The hydrogen gas may be introduced in an amount of 35 ppm to 250 ppm, 80 ppm to 200 ppm, 100 ppm to 190 ppm, or 150 ppm to 180 ppm based on the weight of ethylene. The above hydrogen gas content maintains the chain propagation and chain transfer rate almost constant, and may minimize the content of low molecular weight region with a narrow molecular weight distribution and lower VOCs.

The preparation of the polyethylene composition can be performed in a slurry polymerization method by applying a conventional apparatus and contacting technique using ethylene or ethylene and alpha-olefin as raw materials in the presence of the catalyst composition described above.

The method for preparing the polyethylene may copolymerize ethylene and alpha-olefin using a continuous slurry polymerization reactor, a loop slurry reactor, or the like, but is not limited thereto.

In addition, the polymerization may be performed at a temperature of about 25° C. to 500° C., preferably about 25° C. to 200° C., and more preferably about 50° C. to 150° C. In addition, the polymerization may be performed at a pressure of about 1 kgf/$cm^2$ to 100 kgf/$cm^2$, preferably about 1 kgf/$cm^2$ to 50 kgf/$cm^2$, and more preferably about 5 kgf/$cm^2$ to 30 kgf/$cm^2$.

In the ethylene polymerization process of the present disclosure, the catalyst composition including the above-described first metallocene compound and the second metallocene compound may exhibit high catalytic activity. For example, the catalytic activity during ethylene polymerization is calculated by a ratio of the weight of the prepared polyethylene (kg PE) to the mass of the used supported catalyst (g) per unit time (hr), and may be about 15 kg PE/g·cat·hr or more, or about 15 kg PE/g·cat·hr to about 80 kg PE/g·cat·hr. Specifically, the catalytic activity may be about 20 kg PE/g·cat·hr or more, about 22 kg PE/g·cat·hr or more, or about 23 kg PE/g·cat·hr or more, and about 60 kg PE/g·cat·hr or less, about 50 kg PE/g·cat·hr or less, or about 45 kg PE/g·cat·hr or less.

The polyethylene composition prepared by the method of the above-described embodiment may exhibit excellent injection processability while having more improved mechanical, physical and chemical properties due to various properties by the molecular structure optimization along with a narrow molecular weight distribution. In particular, the polyethylene composition may reduce the generation of harmful gases such as total volatile organic compounds (TVOCs) and fumes that may be generated by low molecular weight polymers.

Meanwhile, according to another embodiment of the present disclosure, there is provided an injection-molded product including the polyethylene composition of the above-described embodiment.

According to another embodiment of the present disclosure, it is possible to provide a molded product capable of securing excellent environmental stress crack resistance using the polyethylene composition of the above-described embodiment, while reducing the generation of harmful gases such as total volatile organic compounds (TVOCs) and fumes that may be generated by low molecular weight polymers.

In particular, since the present disclosure uses the polyethylene composition of the above-described embodiment, an injection-molded product such as a bottle cap having excellent physical and chemical properties can be manufactured even when a relatively low injection pressure of 1000 bar to 1500 bar, or 1200 bar to 1480 bar is applied.

In addition, such an injection-molded product may exhibit excellent physical and chemical properties along with excellent injection processability at a low injection pressure.

More specifically, when the injection-molded product is prepared in the form of a bottle cap by an injection and continuous compression molding (CCM) method using the polyethylene composition prepared by the method of the above-described embodiment, it can exhibit excellent environmental stress resistance crack resistance (ESCR).

For example, the injection-molded product may have environmental stress crack resistance (ESCR) measured according to ASTM D 1693 of 50 hours or more, 55 hours or more, 58 hours or more, 60 hours or more, or 62 hours or more. Specifically, the ESCR of the injection-molded product may be evaluated by measuring the time (F50 hr) at which 50% of cracks occur by applying a pressure of 5 bar after exposure to a 5 wt % IGEPAL solution at a temperature of 42° C. in accordance with ASTM D 1693. A specific measurement method may be understood with reference to Test Example 1 below.

Since the environmental stress crack resistance (ESCR) of the injection-molded product manufactured using the polyethylene composition according to an embodiment of the present disclosure includes very good environmental resistance, the change in physical properties due to long-term storage is minimized to greatly improve reliability of the product.

In addition, the polyethylene composition according to the present disclosure optimizes the molecular structure with a narrow molecular weight distribution to reduce the low molecular weight region in the GPC curve graph and minimize the ratio between specific regions. Therefore, it is possible to significantly reduce the generation of harmful gases such as total volatile organic compounds (TVOCs) and fumes.

The injection-molded product may be, for example, a food and drug storage container, or a cap. For example, it may be a lightweight bottle cap, or other various injection-molded products.

Meanwhile, the injection-molded product of another embodiment may be manufactured according to a general injection method, except that the polyethylene composition prepared by the method of the above-described embodiment is applied and a relatively low injection pressure is applied. An additional description thereof will be omitted.

Hereinafter, preferred examples are provided to aid in understanding the present invention. However, these examples are for illustrative purposes only, and the invention is not intended to be limited by these examples.

EXAMPLES

[Preparation of Catalyst Precursor]

Synthesis Example 1: Preparation of First Metallocene Compound

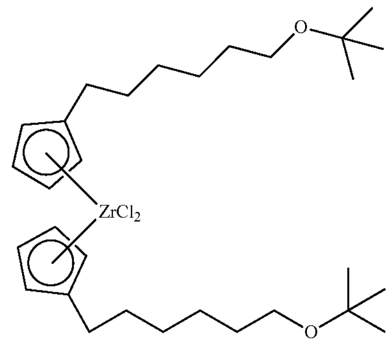

t-butyl-O—$(CH_2)_6$—Cl was prepared by the method shown in Tetrahedron Lett. 2951 (1988) using 6-chlorohexanol, and reacted with cyclopentadienyl sodium (NaCp) to obtain t-butyl-O—$(CH_2)_6$—$C_5H_5$ (yield 60%, b.p. 80° C./0.1 mmHg).

Then, t-butyl-O—$(CH_2)_6$—$C_5H_5$ was dissolved in tetrahydrofuran (THF) at −78° C. and n-butyllithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (170 g, 4.50 mmol)/THF (30 mL) at −78° C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tert-butyl-O—$(CH_2)_6$—$C_5H_4]_2ZrCl_2$] in the form of a white solid (yield 92%).

$^1$H-NMR (300 MHz, $CDCl_3$): δ 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C-NMR (300 MHz, $CDCl_3$, ppm): δ 135.09, 116.66, 112.28, 72.42, 61.52, 30.66, 30.31, 30.14, 29.18, 27.58, 26.00.

Synthesis Example 2: Preparation of Second Metallocene Compound

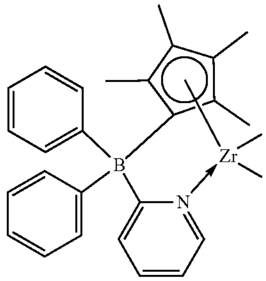

After dissolving 2-bromopyridine (1 eq.) in tetrahydrofuran (0.1 M), n-butyllithium (1 eq.) was slowly added dropwise at −90° C., followed by stirring at the same temperature for 1 hour. Thereafter, chlorodiphenylborane (1 eq.) was dissolved in toluene (0.3 M), and slowly added dropwise to the first reactant at −78° C., followed by stirring for 1 hour. After stirring at room temperature for 12 hours, the solvent was vacuum dried, toluene was added, and the residue from which the solid was removed through a filter was vacuum dried to obtain diphenyl(pyridin-2-yl)borane.

After dissolving the diphenyl(pyridin-2-yl)borane (1 eq.) in tetrahydrofuran (0.1 M), a solution in which lithium tetramethylcyclopentadienide (Li($CpMe_4$), 1 eq.) was dissolved in tetrahydrofuran (0.1 M) was slowly added dropwise at 0° C., followed by stirring at room temperature overnight. Thereafter, the solvent was vacuum dried, and then toluene/diethyl ether (3/1 by volume, 0.3 M) was added and dissolved. Then, $MCl_4$ (1 eq.) was mixed with toluene (0.2 M) and added at −78° C., followed by stirring at room temperature overnight. After completion of the reaction, the solvent was vacuum dried, dichloromethane was added to remove salts through a filter, etc., and the filtrate was vacuum dried and recrystallized by adding dichloromethane/hexane. The resulting solid was filtered and vacuum dried to obtain dichloro{diphenyl(pyridin-2-yl-κN)($\eta^5$-2,3,4,5-tetramethylcyclopenta-2,4-dien-1-ylidene)borate}zirconium (IV).

Dichloro{diphenyl(pyridin-2-yl-κN)($\eta^5$-2,3,4,5-tetramethylcyclopenta-2,4-dien-1-ylidene)borate}zirconium(IV) (1 eq.) was dissolved in toluene/diethyl ether (3/1 by volume, 0.3 M), and then a solution in which methyl lithium (2 eq.) was dissolved in hexane or diethyl ether was slowly added dropwise at −78° C., followed by stirring at room temperature for 12 hours. After completion of the reaction, the solvent was vacuum dried, dichloromethane was added to remove salts through a filter, etc., and the filtrate was vacuum dried and recrystallized by adding dichloromethane/hexane. The resulting solid was filtered and vacuum dried to obtain a precursor compound.

$^1$H NMR (500 MHz, $CDCl_3$, ppm): δ 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H).

Comparative Synthesis Example 1

(1) Preparation of Ligand A

A 1-benzothiophene solution was prepared by dissolving 4.0 g (30 mmol) of 1-benzothiophene in THF. Then, 14 mL (36 mmol, 2.5 M in hexane) of an n-BuLi solution and 1.3 g (15 mmol) of CuCN were added to the 1-benzothiophene solution.

Then, 3.6 g (30 mmol) of tigloyl chloride was slowly added to the above solution at −80° C., and the resulting solution was stirred at room temperature for about 10 hours.

Thereafter, 10% HCl was poured into the above solution to quench the reaction, and the organic layer was separated with dichloromethane to obtain (2E)-1-(1-benzothien-2-yl)-2-methyl-2-buten-1-one in the form of a beige solid.

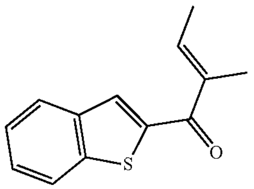

$^1$H NMR (300 MHz, $CDCl_3$, ppm): δ 7.85-7.82 (m, 2H), 7.75 (m, 1H), 7.44-7.34 (m, 2H), 6.68 (m, 1H), 1.99 (m, 3H), 1.92 (m, 3H).

34 mL of sulfuric acid was slowly added to the solution in which 5.0 g (22 mmol) of 2E)-1-(1-benzothien-2-yl)-2-methyl-2-buten-1-one prepared above was dissolved in 5 mL of chlorobenzene while vigorous stirring. Then, the solution was stirred at room temperature for about 1 hour. Thereafter, ice water was poured into the solution, the organic layer was separated with an ether solvent, and 4.5 g of 1,2-dimethyl-1,2-dihydro-3H-benzo[b]cyclopenta[d]thiophen-3-one was obtained in the form of a yellow solid (91% yield).

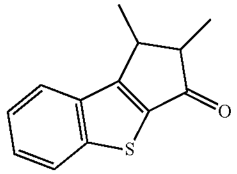

$^1$H NMR (300 MHz, $CDCl_3$, ppm): δ 7.95-7.91 (m, 2H), 7.51-7.45 (m, 2H), 3.20 (m, 1H), 2.63 (m, 1H), 1.59 (d, 3H), 1.39 (d, 3H).

570 mg (15 mmol) of $NaBH_4$ was added to the solution in which 2.0 g (9.2 mmol) of 1,2-dimethyl-1,2-dihydro-3H-benzo[b]cyclopenta[d]thiophen-3-one was dissolved in a mixed solvent of 20 mL of THF and 10 mL of methanol at 0° C. Then, the solution was stirred at room temperature for about 2 hours. Thereafter, HCl was added to the solution to adjust the pH to 1, and the organic layer was separated with an ether solvent to obtain an alcohol intermediate.

A solution was prepared by dissolving the alcohol intermediate in toluene. Then, 190 mg (1.0 mmol) of p-toluenesulfonic acid was added to the solution, and refluxed for about 10 minutes. The obtained reaction mixture was separated by column chromatography to obtain 1.8 g (9.0 mmol, 98% yield) of 1,2-dimethyl-3H-benzo[b]cyclopenta[d]thiophene (ligand A) in the form of an orange-brown liquid.

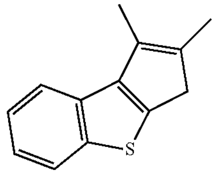

$^1$H NMR (300 MHz, $CDCl_3$, ppm): δ 7.81 (d, 1H), 7.70 (d, 1H), 7.33 (t, 1H), 7.19 (t, 1H), 6.46 (s, 1H), 3.35 (q, 1H), 2.14 (s, 3H), 1.14 (d, 3H).

(2) Preparation of Ligand B 13 mL (120 mmol) of t-butylamine and 20 mL of an ether solvent were placed in a 250 mL schlenk flask, and 16 g (60 mmol) of (6-tert-butoxyhexyl)dichloro(methyl)silane and 40 mL of an ether solvent were placed in another 250 mL schlenk flask to prepare a t-butylamine solution and a (6-tert-butoxyhexyl)dichloro(methyl)silane solution, respectively. Then, the t-butylamine solution was cooled to −78° C., and the (6-tert-butoxyhexyl)dichloro(methyl)silane solution was slowly injected into the cooled solution, followed by stirring at room temperature for about 2 hours. The resulting white suspension was filtered to obtain 1-(6-(tert-butoxy)hexyl)-N-(tert-butyl)-1-chloro-1-methylsilaneamine (ligand B) in the form of an ivory liquid.

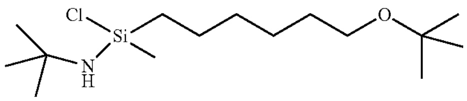 [SMILES: CC(C)(C)N[Si](C)(Cl)CCCCCCOC(C)(C)C]

$^1$H NMR (300 MHz, $CDCl_3$, ppm): δ 3.29 (t, 2H), 1.52-1.29 (m, 10H), 1.20 (s, 9H), 1.16 (s, 9H), 0.40 (s, 3H).

(3) Cross-Linking of Ligands A and B 1.7 g (8.6 mmol) of 1,2-dimethyl-3H-benzo[b]cyclopenta[d]thiophene (ligand A) was added in a 250 mL schlenk flask, followed by adding 30 mL of THF to prepare a ligand A solution. After the ligand A solution was cooled to −78° C., 3.6 mL (9.1 mmol, 2.5 M in hexane) of an n-BuLi solution was added to the ligand A solution. Then, the mixture was stirred at room temperature overnight to obtain a purple-brown solution. The solvent of the purple-brown solution was replaced with toluene and a solution in which 39 mg (0.43 mmol) of CuCN was dispersed in 2 mL of THF was injected thereto to prepare a solution A.

Meanwhile, a solution B prepared by injecting 1-(6-(tert-butoxy)hexyl)-N-(tert-butyl)-1-chloro-1-methylsilaneamine (ligand B) and toluene into a 250 mL schlenk flask was cooled to −78° C. The solution A prepared above was slowly injected into the cooled solution B. Then, the mixture of solutions A and B was stirred at room temperature overnight. Thereafter, the resulting solid was removed by filtration to obtain 4.2 g (>99% yield) of 1-(6-(tert-butoxy)hexyl)-N-(tert-butyl)-1-(1,2-dimethyl-3H-benzo[b]cyclopenta[d]thiophen-3-yl)-1-methylsilaneamine (cross-linked product of ligands A and B) in the form of a brown viscous liquid.

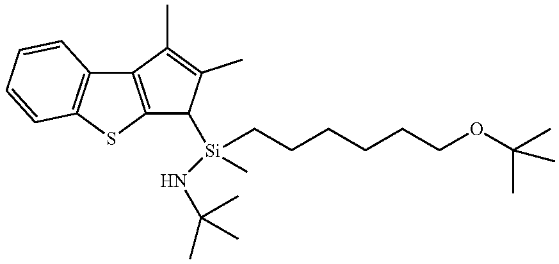 [SMILES: CC1=C(C)C([Si](C)(CCCCCCOC(C)(C)C)NC(C)(C)C)c2sc3ccccc3c21]

In order to confirm the structure of the cross-linked product of ligands A and B, the cross-linked product was lithiated at room temperature, and then an H-NMR spectrum was obtained using a sample dissolved in a small amount of pyridine-D5 and $CDCl_3$.

$^1$H NMR (300 MHz, pyridine-D5 and $CDCl_3$, ppm): δ 7.81 (d, 1H), 7.67 (d, 1H), 7.82-7.08 (m, 2H), 3.59 (t, 2H), 3.15 (s, 6H), 2.23-1.73 (m, 10H), 2.15 (s, 9H), 1.91 (s, 9H), 1.68 (s, 3H).

(4) Preparation of Transition Metal Compound 4.2 g (8.6 mmol) of 1-(6-(tert-butoxy)hexyl)-N-(tert-butyl)-1-(1,2-dimethyl-3H-benzo[b]cyclopenta[d]thiophene-3-yl)-1-methylsilaneamine (cross-linked product of ligands A and B) was added in a 250 mL schlenk flask, and 14 mL of toluene and 1.7 mL of n-hexane were added to the flask to dissolve the cross-linked product. The solution was cooled to −78° C., and then 7.3 mL (18 mmol, 2.5 M in hexane) of an n-BuLi solution was injected into the cooled solution. Thereafter, the solution was stirred at room temperature for about 12 hours. Then, 5.3 mL (38 mmol) of trimethylamine was added to the solution, followed by stirring at about 40° C. for about 3 hours to prepare a solution C.

Meanwhile, 2.3 g (8.6 mmol) of $TiCl_4(THF)_2$ and 10 mL of toluene were placed in a separately prepared 250 mL schlenk flask to prepare a solution D in which $TiCl_4(THF)_2$ was dispersed in toluene. The solution C prepared before the solution D was slowly injected at −78° C., and the mixture of solutions C and D was stirred at room temperature for about 12 hours. Thereafter, the solution was depressurized to remove the solvent, and the resulting solute was dissolved in toluene. Then, the solid not dissolved in toluene was removed by filtration, and the solvent was removed from the filtered solution to obtain 4.2 g (83% yield) of a transition metal compound in the form of a brown solid.

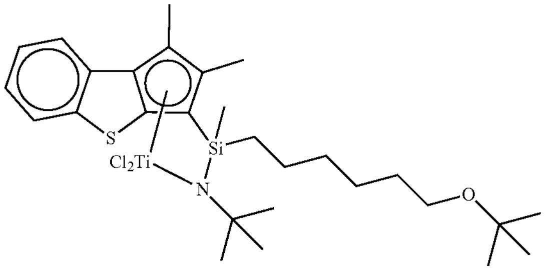

$^1$H NMR (300 MHz, $CDCl_3$, ppm): δ 8.01 (d, 1H), 7.73 (d, 1H), 7.45-7.40 (m, 2H), 3.33 (t, 2H), 2.71 (s, 3H), 2.33 (d, 3H), 1.38 (s, 9H), 1.18 (s, 9H), 1.80-0.79 (m, 10H), 0.79 (d, 3H).

[Preparation of Supported Catalyst]

Preparation Example 1: Preparation of Supported Catalyst 5.0 kg of a toluene solution was added to a 20 L stainless steel (sus) high-pressure reactor, and the reactor temperature was maintained at 40° C. 1000 g of silica (manufactured by Grace Davison, SP948) dehydrated by applying vacuum at a temperature of 600° C. for 12 hours was placed in the reactor and sufficiently dispersed, and then 0.1 mole of the metallocene compound of Synthesis Example 1 was dissolved in toluene and added thereto, followed by stirring at 200 rpm at 40° C. for 2 hours to react. Thereafter, stirring was stopped, settling was performed for 30 minutes, and the reaction solution was decanted.

2.5 kg of toluene was added to the reactor, and 9.4 kg of a 10 wt % methylaluminoxane (MAO)/toluene solution was added thereto, followed by stirring at 200 rpm at 40° C. for 12 hours. After the reaction, stirring was stopped, settling was performed for 30 minutes, and the reaction solution was decanted. After adding 3.0 kg of toluene and stirring for 10 minutes, stirring was stopped and settling was performed for 30 minutes, and the toluene solution was decanted.

3.0 kg of toluene was added to the reactor, and then 0.25 mole of the metallocene compound of Synthesis Example 2 was dissolved in 1 L of toluene solution and added to the reactor, followed by stirring at 200 rpm at 40° C. for 2 hours to react. At this time, the molar ratio of the metallocene compound of Synthesis Example 1 and the metallocene compound of Synthesis Example 2 was 1:2.5. After the reactor temperature was lowered to room temperature, stirring was stopped, settling was performed for 30 minutes, and the reaction solution was decanted.

After adding 2.0 kg of toluene and stirring for 10 minutes, stirring was stopped and settling was performed for 30 minutes, and the reaction solution was decanted.

3.0 kg of hexane was added to the reactor, the hexane slurry was transferred to a filter dry, and the hexane solution was filtered. It was dried under reduced pressure at 40° C. for 4 hours to prepare 1 kg-$SiO_2$ hybrid supported catalyst of Preparation Example 1.

Comparative Preparation Example 1: Preparation of Supported Catalyst

A hybrid supported catalyst of Comparative Preparation Example 1 was prepared in the same manner as in Preparation Example 1, except that the metallocene compound of Synthesis Example 1 and the metallocene compound of Comparative Synthesis Example 1 were used, and the molar ratio of the catalyst precursors (metallocene compound of Synthesis Example 1: metallocene compound of Comparative Synthesis Example 1) was changed to 1:2.2.

[Preparation of Polyethylene Composition]

Example 1

The polyethylene composition of Example 1 was prepared by performing a continuous slurry polymerization process with a continuous slurry reactor under the conditions shown in Table 1 using the supported catalyst prepared in Preparation Example 1 above.

Specifically, as shown in the FIGURE, the polyethylene composition was prepared using a continuous slurry reactor including a first polymerization reactor (R1), a second polymerization reactor (R2), and a post reactor (Post-R). First, in both the first reactor (R1) and the second reactor (R2) of the continuous slurry reactor, 113 mL/h of catalyst, 10 kg/h of ethylene, 1.8 g/h of hydrogen, and 1.8 mL/min 1-butene were added, respectively. Each reactor (R1, R2) had a stirrer, and the rotation speed was 250 rpm to 260 rpm. In addition, triethylaluminum (TEAL) was added at 150 mL/h to remove moisture, and an antistatic agent (ASA, Atmer163) was added at 25 mL/h to prevent static electricity in the polymerized powder. At this time, hydrogen, ethylene, and 1-butene were added in gaseous form, and the catalyst, TEAL, and ASA were dissolved in hexane and added into the reactor. Thereafter, the powder polymerized in the first reactor (R1) and the second reactor (R2) was transferred to a post reactor (Post-R) in parallel and then mixed.

Example 2

A polyethylene composition of Example 2 was prepared in the same manner as in Example 1, except that the continuous slurry polymerization process was performed under the conditions as shown in Table 1 below by varying the amount of hydrogen input and the amount of 1-butene input.

Comparative Example 1

A high-density polyethylene (HDPE) product (manufactured by Ineos, INEOS CAP508) using a Ziegler-Natta (Z/N) catalyst was prepared as Comparative Example 1.

Comparative Example 2

A high-density polyethylene (HDPE) product (manufactured by Ineos, INEOS CAP602) using a Ziegler-Natta (Z/N) catalyst was prepared as Comparative Example 2.

Comparative Example 3

A high-density polyethylene (HDPE) product (manufactured by Borealis, BOREALIS MB5568) using a Ziegler-Natta (Z/N) catalyst was prepared as Comparative Example 3.

Comparative Example 4

A high-density polyethylene (HDPE) product (manufactured by LG Chem, LG BE0400) using a Ziegler-Natta (Z/N) catalyst was prepared as Comparative Example 4.

Comparative Example 5

A high-density polyethylene (HDPE) product (manufactured by LG Chem, LG SM100) prepared by mass production using the metallocene-supported catalyst prepared in Comparative Preparation Example 1 was prepared as Comparative Example 5.

Comparative Example 6

A polyethylene composition of Comparative Example 6 was prepared in the same manner as in Example 1, except that the supported catalyst prepared in Comparative Preparation Example 1 was used instead of the supported catalyst of Preparation Example 1 and the continuous slurry polymerization process was performed under the conditions as shown in Table 1 below by varying the amount of hydrogen input and the amount of 1-butene input.

Comparative Example 7

A polyethylene composition of Comparative Example 7 was prepared in the same manner as in Comparative Example 6, except that the continuous slurry polymerization process was performed under the conditions as shown in Table 1 below by varying the amount of hydrogen input and the amount of 1-butene input.

The main conditions of the polymerization process of the polyethylene compositions according to the above-described Examples and Comparative Examples are shown in Table 1 below.

TABLE 1

| | Catalyst or Product | Ethylene (kg/hr) | Hydrogen (g/hr) | 1-butene (mL/min) | Activity (kg PE/g · cat · h) |
|---|---|---|---|---|---|
| Example 1 | Preparation Example 1 | 10 | 1.5 | 3.5 | 23.5 |
| Example 2 | Preparation Example 1 | 10 | 1.8 | 1.8 | 24.9 |
| Comparative Example 1 | CAP508 | — | — | — | — |
| Comparative Example 2 | CAP602 | — | — | — | — |
| Comparative Example 3 | MB5568 | — | — | — | — |

TABLE 1-continued

| | Catalyst or Product | Ethylene (kg/hr) | Hydrogen (g/hr) | 1-butene (mL/min) | Activity (kg PE/g · cat · h) |
|---|---|---|---|---|---|
| Comparative Example 4 | BE0400 | — | — | — | — |
| Comparative Example 5 | SM100 | — | — | — | — |
| Comparative Example 6 | Comparative Preparation Example 1 | 10 | 3.2 | 4.5 | 20.0 |
| Comparative Example 7 | Comparative Preparation Example 1 | 10 | 2.8 | 4.0 | 21.2 |

In Table 1, the catalytic activity (kg PE/g·cat·h) was calculated by a ratio of the weight of the prepared polyethylene (kg PE) to the mass of the used supported catalyst (g) per unit time (h).

[Evaluation of Physical Properties of Polyethylene Composition and Injection-Molded Products]

Test Example 1

The physical properties of the polyethylene compositions according to Examples and Comparative Examples and injection-molded products using the same were measured in the following manner, and the results are shown in Table 2 below.

Specifically, each of the polyethylene compositions according to Examples and Comparative Examples was put into a single screw extruder (L/D=20) having a diameter of 35 mm, followed by melt kneading and reactive extrusion at a temperature of about 200° C. Then, it was cooled to obtain each pellet composition. Furthermore, each injection-molded product (cap) was prepared by using the pellet composition thus obtained with an injection molding machine set at a temperature of about 240° C.

1) Melt Index (MI, g/10 min)

The melt index ($MI_{2.16}$, $MI_5$) was measured at a temperature of 190° C. under a load of 2.16 kg and 5 kg, respectively, and expressed as the weight (g) of the polymer melted for 10 minutes.

2) Melt Flow Rate Ratio (MFRR)

The melt flow rate ratio (MFRR, $MI_5/MI_{2.16}$) is a ratio of $MI_5$ (MI, 5 kg load) divided by $MI_{2.16}$ (MI, 2.16 kg load).

3) Density

The density (g/$cm^3$) of the polyethylene composition was measured in accordance with ASTM D 1505.

4) Melting Temperature (Tm)

The melting temperature (melting point, Tm) was measured using a Differential Scanning Calorimeter (DSC).

Specifically, the melting temperature of the polymer was measured using a differential scanning calorimeter (DSC, DSC 2920, manufactured by TA instrument). After heating the polyethylene composition to 200° C., the temperature was maintained at that temperature for 5 minutes, and then lowered to 30° C. Thereafter, the temperature was increased again, and the temperature at the top of the DSC curve was measured as Tm. Herein, the temperature was increased and lowered at a rate of 10° C./min, respectively. Tm was measured in the section where the temperature rises for the second time.

5) Weight Average Molecular Weight (Mw) and Molecular Weight Distribution (PDI, Polydispersity Index)

The molecular weight distribution (PDI) was calculated by measuring a weight average molecular weight (Mw) and a number average molecular weight (Mn) using gel permeation chromatography (GPC, manufactured by Water), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polyethylene sample was pretreated by dissolving in 1,2,4-trichlorobenzene containing 0.0125% of BHT (2,6-bis(1,1-dimethylethyl)-4-methylphenol)) for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

6) Linear Structural Fraction

The linear structure fraction ($R_{OL}$) was calculated from a log graph with respect to the weight average molecular weight (Mw) of polyethylene measured using gel permeation chromatography (GPC, manufactured by Water) as described above.

Specifically, the ratio (%) of an integral value in the region where Log MW is less than 3 (log MW<3, $A_1$), 3 or more and 3.5 or less (3≤log MW≤3.5, $A_2$), or 5.5 or more (5≤log MW, $A_3$) of a total integral value in a log graph with respect to the weight average molecular weight (Mw) of polyethylene measured using GPC as described above, which is a GPC curve graph having an x-axis of log Mw and a y-axis of dw/d log Mw, was calculated, respectively, and shown in Table 1 below. With the ratio ($A_1$) of an integral value in the region where Log MW is less than 3 and the ratio ($A_2$) of an integral value in the region where Log MW is 3 or more and less than 3.5, the linear structure fraction ($R_{OL}$) was calculated according to the following Equation 1 and shown in Table 2 below.

$$R_{OL} = (A_1 / A_2) \times 100 \qquad \text{[Equation 1]}$$

in Equation 1, $R_{OL}$ represents a linear structural fraction (%) contained in the polyethylene composition, $A_1$ represents a ratio ($A_1$, %) of an integral value in the region where Log MW is less than 3 to an integral value in the entire x-axis in a GPC curve graph having an x-axis of log MW and a y-axis of dw/d log Mw, and $A_2$ represents a ratio ($A_2$, %) of an integral value in the region where Log MW is 3 or more and less than 3.5 to an integral value in the entire x-axis in a GPC curve graph having an x-axis of log MW and a y-axis of dw/d log Mw.

7) Analysis of Polymer Content in Low Molecular Weight Region (GC Area)

The polymer content in the low molecular weight region was analyzed (GC Area) in the following manner for polyethylene compositions according to Examples and Comparative Examples, and the results are shown in Table 2 below.

1. 10 mL of xylene was added to 0.5 g of a polyethylene composition sample, and heated at 140° C.
2. When the polyethylene composition sample was completely melted, it was cooled to room temperature (about 25° C.), and then 10 mL of ethanol was added to precipitate the melted sample.

3. After centrifugation of the sample, 10 mL of the supernatant was taken and dried with $N_2$ blow.
4. The dried sample was dissolved again in 1 mL of chloroform and analyzed by gas chromatography (GC/FID).
5. Procedure for Quantitative Analysis:

1) GC/FID Conditions:

Column: HP-5MS (0.32 mm ID×30 mL, 0.25 mm d.f. capillary).

Column Flow: 2 mL/min.

Oven temperature: 100° C. (3 min)-15° C./min-320° C. (20 min).

Injection volume: 0.5 μL.

Split ratio: 1/20.

6. In the gas chromatography (GC/FID) analysis graph (x-axis: time, y-axis: abundance) obtained by the above method, the sum of areas of each peak corresponding to 14 to 32 carbons (C14 to C32) was obtained and divided by the sample weight. This was converted to a relative value at the same weight (e.g., 1 g) to calculate a relative ratio, and the resulting value (GC Area) is shown in Table 2 below.

8) CAP Environmental Stress Crack Resistance (CAP ESCR)

The injection-molded product (cap) prepared by using the polyethylene composition according to Examples and Comparative Examples as described above was subjected to CAP environmental stress crack resistance (CAP ESCR, F50 hr) test in accordance with ASTM D 1693.

Specifically, bent strip environmental stress crack resistance (CAP ESCR) was measured in accordance with ASTM D 1693 using a CAP ESCR measuring device (IPPS-IM) manufactured by STEINFURTH with 5% IGEPAL and Condition B at 42° C.

1. The injection-molded cap as described above was used.
2. A CAP ESCR measuring device (IPPS-IM) manufactured by STEINFURTH was used.
3. The cap was fastened to the preform, and then mounted on a bench of the IPPS-IM.
4. The cap was immersed in Igepal 5% solution, and CAP ESCR was measured at a temperature of 42° C. and a pressure of 5 bar.

9) Total Volatile Organic Compound (TVOC)

A volatile organic compound (VOC, μg/g) analysis was performed at 200° C. for the polyethylene compositions according to Examples and Comparative Examples as follows. The measured value for the polyethylene composition of Example 1 was set to 100%, and then TVOC relative values (%) calculated therewith for the polyethylene compositions of Example 2 and Comparative Examples 1 to 7 are shown in Table 2 below.

Specifically, the volatile organic compound (VOC) analysis was performed under the following conditions using a gas chromatography-mass spectrometer (JTD-GC/MS-02).

1. 20 mg of a polyethylene composition sample was placed in a PAT tube.
2. Procedure for Quantitative Analysis:

1) JTD condition: Split ratio=1/100.
2) Temperature and time: 200° C., 10 min.
3) GC oven: 50° C. (5 min)-10° C. (25 min)-300° C. (20 min).
4) Column: HP-5MS (60 m×0.32 mm×-0.25 um ID).
5) About 17 mg of toluene was diluted in 10 mL of MeOH to prepare about 1.7 μg/μL of a toluene standard solution.
6) After injecting 1 μL of the standard solution into Tenax PAT, a cap was put on and analyzed by JTD.
7) The sample-injected PAT was analyzed by JTD.
8) Calculate as follows: VOCcompound=[(Acompound/Astd)×Cstd]/Wsample.
9) VOCcompound=VOC value (μg/g) of each substance generated in the measurement sample.

Acompound=The chromatogram area of the peak of each substance in the measurement sample.

Astd=peak area of toluene standard solution.

Cstd=mass of toluene injected using toluene standard solution (about 1.7 μg/g).

Wsample=weight (g) of the sample to be measured.

More specifically, the TVOC value measured by the method as described above for the polyethylene composition of Example 1 was 80.5 μg/g. By setting this to 100%, the TVOC relative values (%) for the remaining polyethylene compositions of Example 2 and Comparative Examples 1 to 7 were calculated and are shown in Table 2 below.

TABLE 2

| | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| $MI_{2.16}$ (g/10 min) | 0.35 | 0.29 | 1.8 | 0.8 | 0.8 | 0.27 | 1.05 | 0.49 | 0.42 |
| $MI_5$ (g/10 min) | 1.48 | 1.24 | 5.94 | 2.72 | 2.92 | 1.12 | 4.11 | 1.99 | 1.72 |
| MFRR ($MI_5/MI_{2.16}$) | 4.24 | 4.27 | 3.3 | 3.4 | 3.65 | 4.15 | 3.91 | 4.07 | 4.09 |
| Density (g/cm$^3$) | 0.954 | 0.955 | 0.953 | 0.953 | 0.956 | 0.959 | 0.951 | 0.952 | 0.952 |
| Tm (° C.) | 130.3 | 129.3 | 129.7 | 129.9 | 130.4 | 132.9 | 128.4 | 128.1 | 128.8 |
| Mw (x1000 g/mol) | 138 | 150 | 105 | 130 | 133 | 184 | 112 | 121 | 125 |
| PDI (Mw/Mn) | 10.8 | 11.5 | 17.4 | 16.5 | 22.9 | 13.8 | 11.3 | 12.6 | 12.8 |
| $A_1$ (%) | 0.3 | 0.4 | 2.8 | 2.0 | 3.0 | 0.7 | 1.3 | 0.6 | 0.7 |
| $A_2$ (%) | 3.8 | 4.3 | 6.0 | 4.9 | 6.3 | 5.4 | 5.8 | 5.2 | 6.9 |
| $A_3$ (%) | 12.6 | 13.7 | 8.7 | 10.8 | 10.8 | 11.7 | 9.3 | 10.9 | 11 |
| $A_2 - A_1$(%) | 3.5 | 3.9 | 3.2 | 2.9 | 3.3 | 4.7 | 4.5 | 4.6 | 6.2 |
| $R_{OL}$ (%) | 7.89 | 9.30 | 46.67 | 40.82 | 47.62 | 12.96 | 22.41 | 11.54 | 10.14 |
| GC Area | 381 | 419 | 4741 | 4077 | 5324 | 1720 | 1148 | 621 | 593 |

TABLE 2-continued

| | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| ESCR (hr) | 66.3 | 62.1 | 14 | 47.6 | 47 | 45.8 | 16 | 37.2 | 40.1 |
| TVOC relative value (%) | 100 | 89 | 748 | 589 | 840 | 364 | 344 | 192 | 158 |

As shown in Table 2, the polyethylene composition of Examples according to the present disclosure minimizes the linear structure fraction by adjusting the molecular structure with a narrow molecular weight distribution, thereby achieving excellent environmental stress crack resistance (CAP ESCR) during the manufacture of injection-molded products such as a food and drug storage container or a cap, and significantly reducing the generation of harmful gases such as total volatile organic compounds (TVOCs) and fumes that may be generated by polymers in the low molecular weight region.

The invention claimed is:

1. A polyethylene composition comprising an ethylene homopolymer and a copolymer of ethylene and a C4-12 alpha-olefin monomer in a weight ratio of 99:1 to 99.5:0.5, wherein the polyethylene composition has:

a melt index, measured according to ASTM D 1238, at 190° C. and 2.16 kg, of 0.20 g/10 min to 0.38 g/10 min, a molecular weight distribution (Mw/Mn) of 8 to 12, a density (ASTM D 1505, 23° C.) of 0.953 g/cm$^3$ to 0.963 g/cm$^3$, and a linear structural fraction (ROL) according to Equation 1 of 5.0% to 10.0%:

$$R_{OL} = (A_1 / A_2) \times 100 \qquad \text{[Equation 1]}$$

in Equation 1, $R_{OL}$ represents a linear structural fraction (%) contained in the polyethylene composition, $A_1$ represents a ratio ($A_1$, %) of an integral value in the region where Log MW is less than 3to an integral value in the entire x-axis in a GPC curve graph having an x-axis of log MW and a y-axis of dw/dlogMw, and $A_2$ represents a ratio ($A_2$, %) of an integral value in the region where Log MW is 3 or more and less than 3.5 to an integral value in the entire x-axis in a GPC curve graph having an x-axis of log MW and a y-axis of dw/dlogMw.

2. The polyethylene composition of claim 1, wherein the $R_{OL}$ is 7.5% to 10.0%.

3. The polyethylene composition of claim 1, wherein the $A_1$ is 0.5% or less.

4. The polyethylene composition of claim 1, wherein the $A_2$ is 3.5% to 4.5%.

5. The polyethylene composition of claim 1, wherein a difference of $A_2$–$A_1$ is 3.0% to 4.0% in a GPC curve graph having an x-axis of log MW and a y-axis of dw/d log Mw.

6. The polyethylene composition of claim 1, wherein a ratio ($A_3$) of an integral value in the region where Log MW is 5.5 or more to an integral value in the entire x-axis in a GPC curve graph having an x-axis of log MW and a y-axis of dw/d log Mw is 11.5% or more.

7. The polyethylene composition of claim 1, which has a molecular weight distribution (Mw/Mn) of 10 to 12.

8. The polyethylene composition of claim 1, which has a density (ASTM D 1505, 23° C.) of 0.953 g/cm$^3$ to 0.955 g/cm$^3$.

9. The polyethylene composition of claim 1, which has a melt index (ASTM D 1238, 190° C., 2.16 kg) of 0.25 g/10 min to 0.35 g/10 min.

10. A method for preparing the polyethylene composition according to claim 1, comprising:

preparing the copolymer of ethylene and a C4-12 α-olefin monomer through a copolymerization process of the ethylene and the C4-12 α-olefin monomer in the presence of at least one first metallocene compound represented by Chemical Formula 1; and at least one second metallocene compound selected from the compounds represented by Chemical Formula 2, mixing the ethylene homopolymer and the copolymer of ethylene and the C4-12 α-olefin in a weight ratio of from 99:1 to 99.5:0.5:

$$(Cp^1R^a)_n(Cp^2R^b)M^1Z^1_{3-n} \qquad \text{[Chemical Formula 1]}$$

in Chemical Formula 1, $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radical, each of which is optionally substituted with $C_{1-20}$ hydrocarbon;

$R^a$ and $R^b$ are the same as or different from each other, and each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ are each independently a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy; and n is 1 or 0:

[Chemical Formula 2]

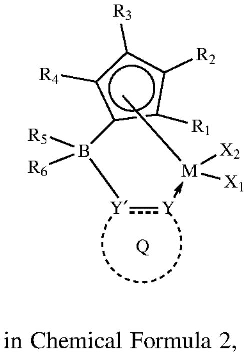

in Chemical Formula 2,

B is boron,

M is a group 4 transition metal, $R_1$ to $R_4$ are the same as or different from each other, and are each independently hydrogen, $C_{1-20}$ alkyl, $C_{3-20}$ cycloalkyl, or $C_{6-20}$ aryl, or at least one pair of $R_1$ and $R_2$ or $R_3$ and $R_4$ is bonded to each other to independently form a substituted or unsubstituted $C_{6-60}$ aromatic ring, $R_5$ and $R_6$ are the same as or different from each other, and are each independently $C_{1-20}$ alkyl, $C_{3-20}$ cycloalkyl, or $C_{6-20}$ aryl, or $R_5$ and $R_6$ are bonded to each other to form a $C_{3-60}$ aliphatic ring or a $C_{6-60}$ aromatic ring, $X_1$ and $X_2$ are the same as or different from each other, and are each independently $C_{1-20}$ alkyl or —O(CO)R', wherein R' is $C_{1-20}$ alkyl, Q is a substituted or unsubstituted C2-60 heterocyclic ring containing at least one selected from the group consisting of N, O and S, Y and Y' are elements constituting Q, Y is N, O, or S, Y'is an element of Q and adjacent to Y, and Y' is N or C.

11. The method for preparing the polyethylene composition of claim 10, wherein in Chemical Formula 1, $M^1$ is zirconium or hafnium; each of $R^a$ and $R^b$ is independently hydrogen, $C_{1-6}$ alkyl, $C_{7-12}$ arylalkyl, $C_{2-12}$ alkoxyalkyl, $C_{6-12}$ aryl, or $C_{2-6}$ alkenyl; and each $Z^1$ is independently a halogen atom.

12. The method for preparing the polyethylene composition of claim 10, wherein the first metallocene compound is a compound represented by any one of the following structural formulae:

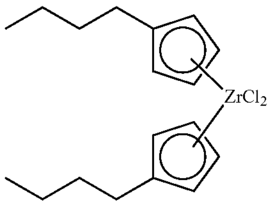

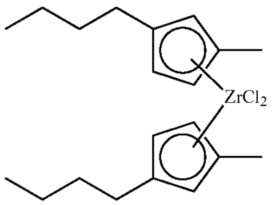

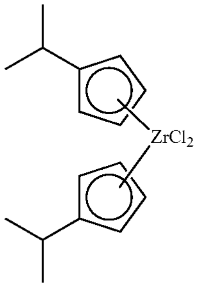

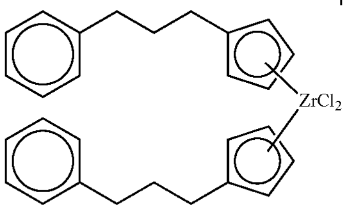

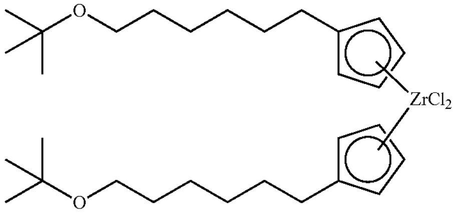

-continued

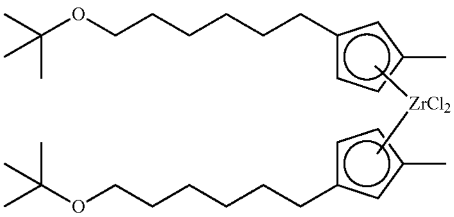

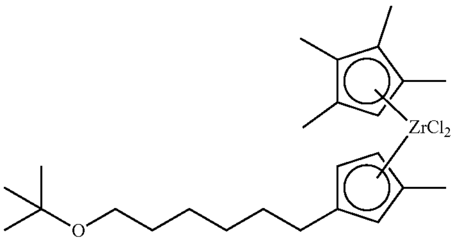

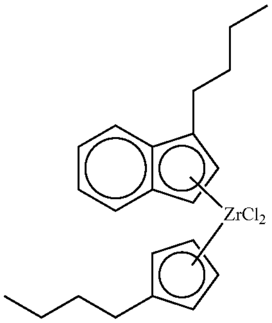

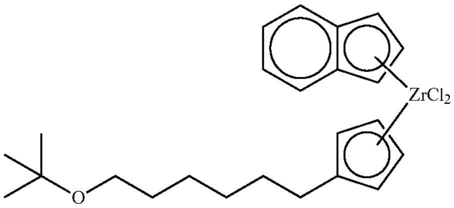

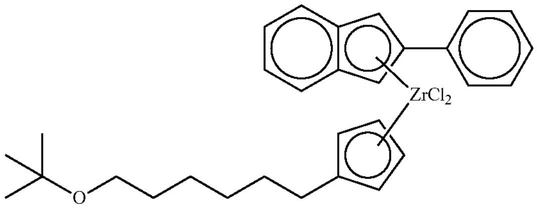

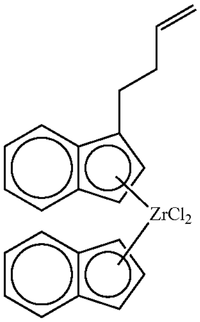

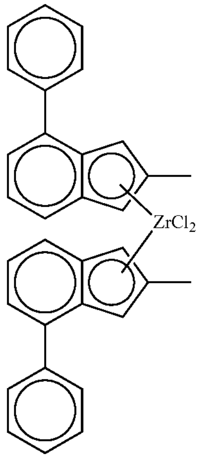

-continued

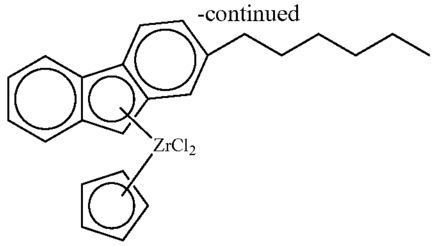

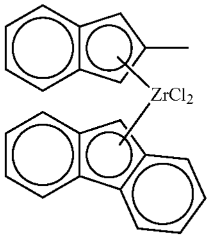

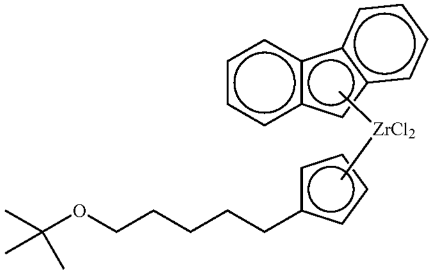

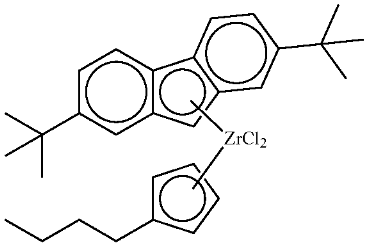

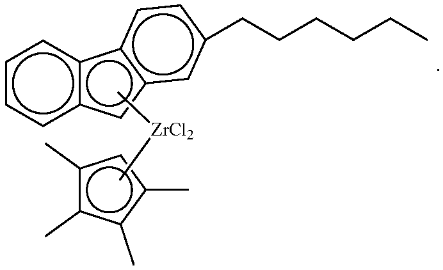

13. The method for preparing the polyethylene composition of claim 10, wherein in Chemical Formula 2, M is zirconium; and $R_1$ to $R_4$ are the same as or different from each other, and are each independently hydrogen or methyl, or at least one pair of $R_1$ and $R_2$ or $R_3$ and $R_4$ is bonded to each other to independently form a benzene ring or a 1,2,3,4-tetrahydronaphthalene ring, which is unsubstituted or substituted with one to four substituents selected from the group consisting of methyl, tertbutyl and 4-tertbutyl phenyl.

14. The method for preparing the polyethylene composition of claim 10, wherein in Chemical Formula 2, $R_5$ and $R_6$ are the same as or different from each other, and are each independently methyl or phenyl, or $R_5$ and $R_6$ are bonded to each other to form a cyclooctane ring.

15. The method for preparing the polyethylene composition of claim 10, wherein in Chemical Formula 2, $X_1$ and $X_2$ are the same as or different from each other, and are each independently methyl or acetate.

16. The method for preparing the polyethylene composition of claim 10, wherein in Chemical Formula 2, Q is a pyridine ring, a 4,5-dihydrooxazole ring, a pyrazole ring, or a benzoxazole ring, each of which is unsubstituted or substituted with one to four substituents selected from the group consisting of methyl, isopropyl and diphenylamino.

17. The method for preparing the polyethylene composition of claim 10, wherein the second metallocene compound is a compound represented by any one of the following structural formulae:

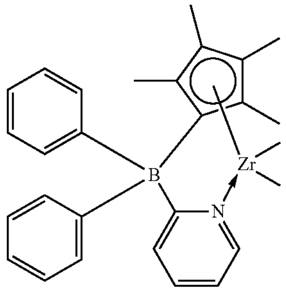

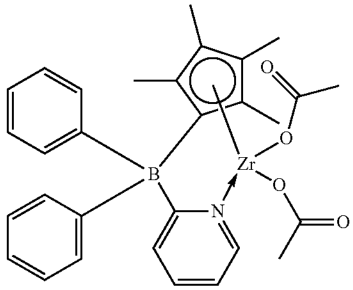

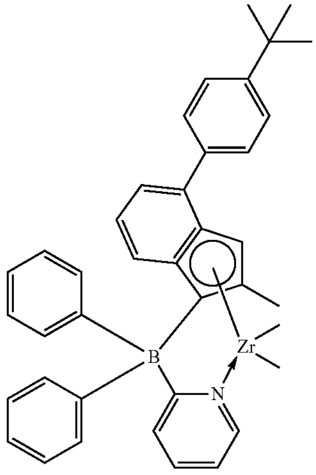

-continued
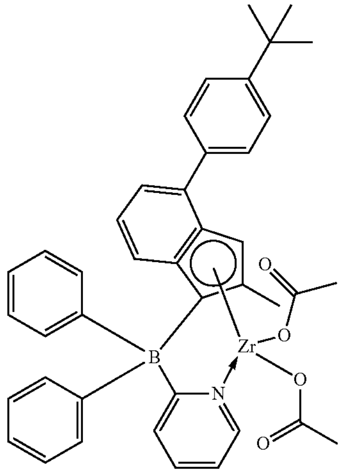
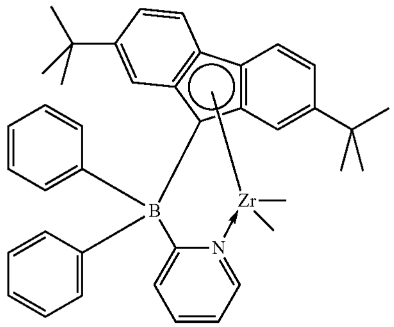
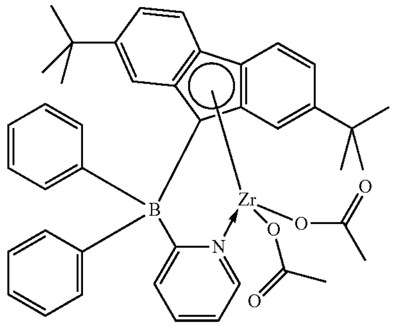
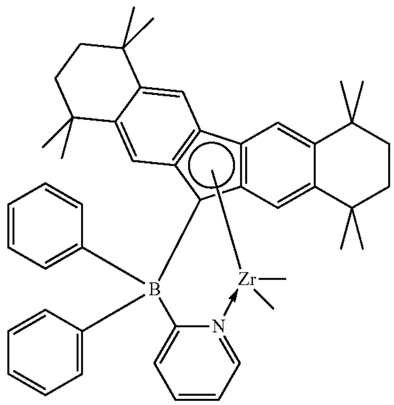
-continued
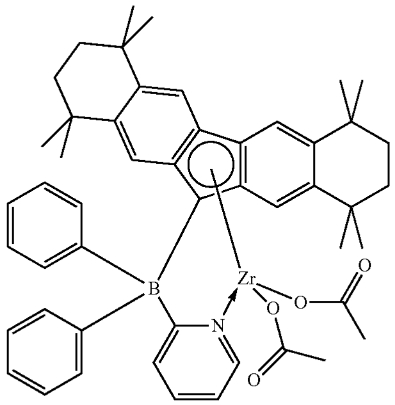
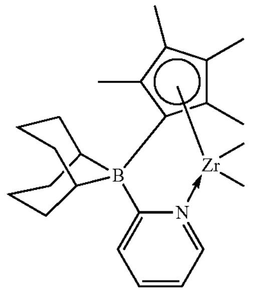
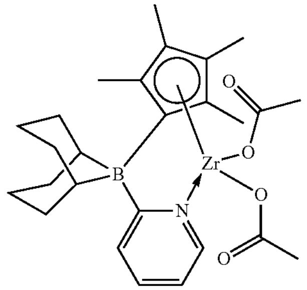
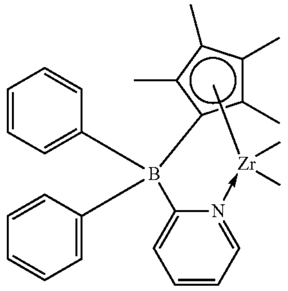
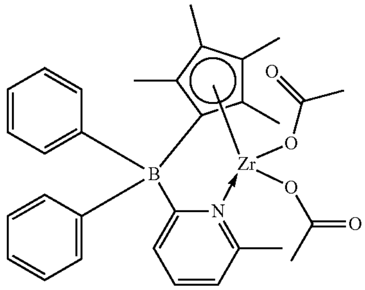

-continued
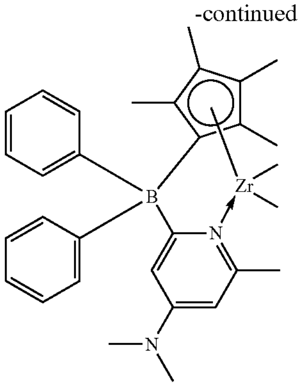
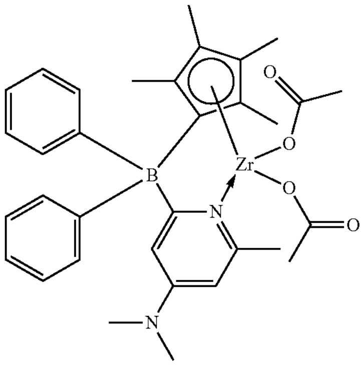
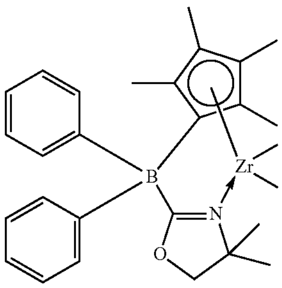
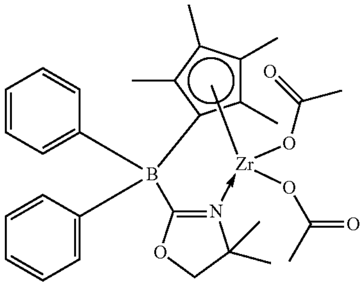
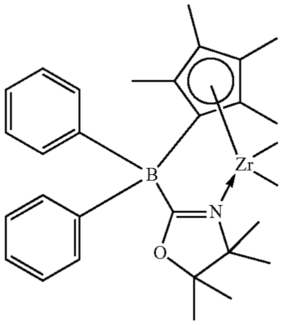
-continued
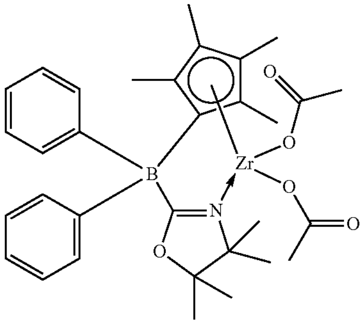
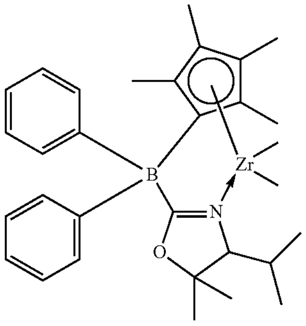
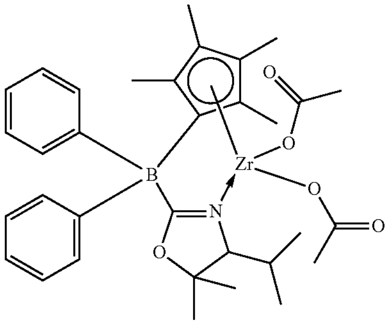
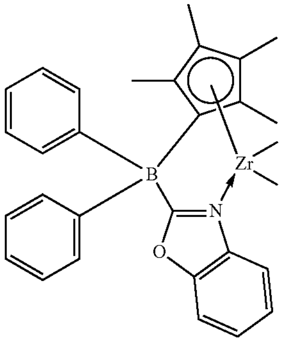
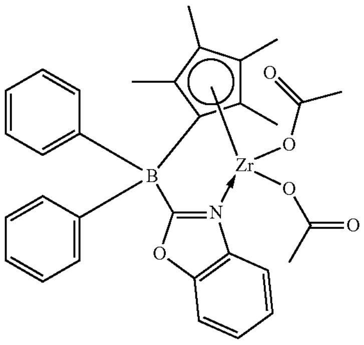

-continued

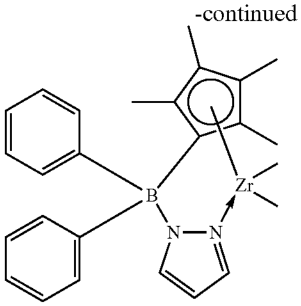

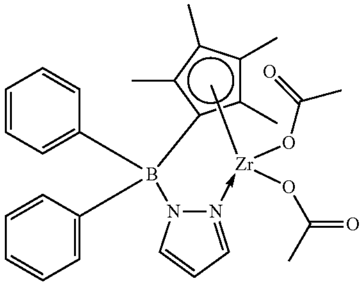

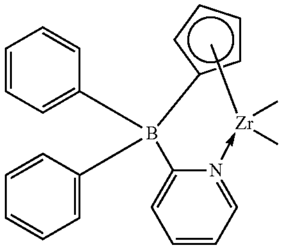

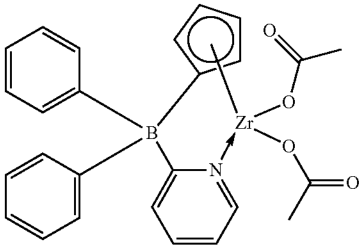

-continued

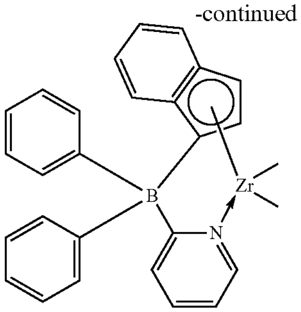

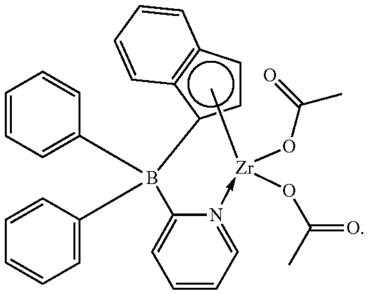

18. The method for preparing the polyethylene composition of claim 10, wherein the first metallocene compound and the second metallocene compound are included in a molar ratio of 1:2 to 1:5.

19. The method for preparing the polyethylene composition of claim 10, wherein the polymerization step is performed while introducing hydrogen gas in an amount of 35 ppm to 250 ppm based on a molar amount of the ethylene.

20. An injection-molded product comprising the polyethylene composition according to claim 1.

* * * * *